(12) United States Patent
Tokuchi

(10) Patent No.: US 10,708,445 B2
(45) Date of Patent: Jul. 7, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/936,447

(22) Filed: Mar. 27, 2018

(65) Prior Publication Data
US 2019/0082061 A1 Mar. 14, 2019

(30) Foreign Application Priority Data

Sep. 13, 2017 (JP) ................. 2017-176003

(51) Int. Cl.
| | |
|---|---|
| H04N 1/00 | (2006.01) |
| H04N 5/77 | (2006.01) |
| H04N 9/82 | (2006.01) |
| H04N 9/804 | (2006.01) |
| H04N 5/907 | (2006.01) |
| B25J 19/02 | (2006.01) |
| B25J 9/16 | (2006.01) |
| G06T 7/70 | (2017.01) |

(52) U.S. Cl.
CPC ....... *H04N 1/00092* (2013.01); *H04N 1/0001* (2013.01); *H04N 1/00005* (2013.01); *H04N 1/00013* (2013.01); *H04N 1/00015* (2013.01); *H04N 1/00018* (2013.01); *H04N 1/00037* (2013.01); *H04N 5/77* (2013.01); *H04N 5/772* (2013.01); *H04N 5/907* (2013.01); *H04N 9/8042* (2013.01); *H04N 9/8205* (2013.01); *H04N 2201/3253* (2013.01)

(58) Field of Classification Search
CPC ............. G06F 3/1261; G06F 3/1292; H04N 2201/0084; H04N 1/00092; H04N 1/00037; H04N 2201/3253; H04N 1/00015
See application file for complete search history.

(56) References Cited

U.S. PATENT DOCUMENTS

| | | | |
|---|---|---|---|
| 6,215,519 B1 * | 4/2001 | Nayar | G08B 13/19608 348/148 |
| 7,027,083 B2 * | 4/2006 | Kanade | H04N 5/222 348/159 |
| 10,437,874 B2 * | 10/2019 | Leppanen | G06F 16/48 |
| 2002/0021304 A1 | 2/2002 | Eguchi | |
| 2005/0073594 A1 | 4/2005 | Tagawa | |

FOREIGN PATENT DOCUMENTS

| | | |
|---|---|---|
| JP | 2002-132558 | 5/2002 |
| JP | 2004-120069 | 4/2004 |

* cited by examiner

*Primary Examiner* — Ahmed A Berhan
(74) *Attorney, Agent, or Firm* — JCIPRNET

(57) ABSTRACT

An information processing apparatus includes a receiver and a controller. The receiver receives an image. The controller controls a state in a real space based on information included in the received image. In a further modification of the invention, the controller may move a position of the information processing apparatus according to an arrangement of the information processing apparatus in the image.

22 Claims, 28 Drawing Sheets

MOVEMENT BY ROBOT

CONTROL OPENING AND CLOSING MECHANISM OF OWN APPARATUS TO CLOSE COVER

⇩ ROBOT CLOSES COVER

PICK UP GARBAGE

MOVE

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-176003 filed Sep. 13, 2017.

BACKGROUND

(i) Technical Field

The present invention relates to an information processing apparatus and a non-transitory computer readable medium.

(ii) Related Art

In general, a dedicated remote controller is provided to operate a device. Each remote controller has buttons for respective functions, and a user operates the buttons according to a desired operation.

SUMMARY

According to an aspect of the invention, an information processing apparatus includes a receiver and a controller. The receiver receives an image. The controller controls a state in a real space based on information included in the received image.

BRIEF DESCRIPTION OF THE DRAWINGS

Exemplary embodiments of the present invention will be described in detail based on the following figures, wherein:

FIGS. 7A and 7B are views for explaining an operation state according to the first exemplary embodiments, in which FIG. 7A illustrates an example of a photograph used for moving the image forming apparatus, and FIG. 7B illustrates a state of moving the image forming apparatus in a real space;

FIGS. 12A and 12B are views for explaining an operation state according to the second exemplary embodiment, in which FIG. 12A illustrates a scene where a photograph is presented to the robot, and FIG. 12B illustrates a scene after the robot finished moving;

FIGS. 16A and 16B are views for explaining an operation state according to the third exemplary embodiment, in which FIG. 16A is a view where a photograph is presented to the image forming apparatus, and FIG. 16B illustrates a scene after the state of the image forming apparatus is changed;

FIGS. 19A and 19B are views for explaining an operation state according to the fourth exemplary embodiment, in which FIG. 19A illustrates a scene where a photograph is presented to the robot, and FIG. 19B illustrates a scene after the robot changes the state of the image forming apparatus;

FIGS. 22A and 22B are views for explaining another operation state according to the fifth exemplary embodiment, in which FIG. 22A illustrates a scene where the robot finds waste paper, and FIG. 22B illustrates a scene where the robot picks up the waste paper and moves to another place;

FIGS. 28A and 28B are views for explaining writing of information that defines the workflow process into attribute information, in which FIG. 28A illustrates a data structure before the information is included in the attribute information of the JPEG file, and FIG. 28B illustrates a state where the information is added to the attribute information of the JPEG file.

DETAILED DESCRIPTION

Hereinafter, exemplary embodiments of the present invention will be described with reference to the accompanying drawings.

First Exemplary Embodiment

<Configuration of Image Processing System>

The configuration of an image processing system 100 according to a first exemplary embodiment will be described with reference to FIG. 1.

Figure 1:
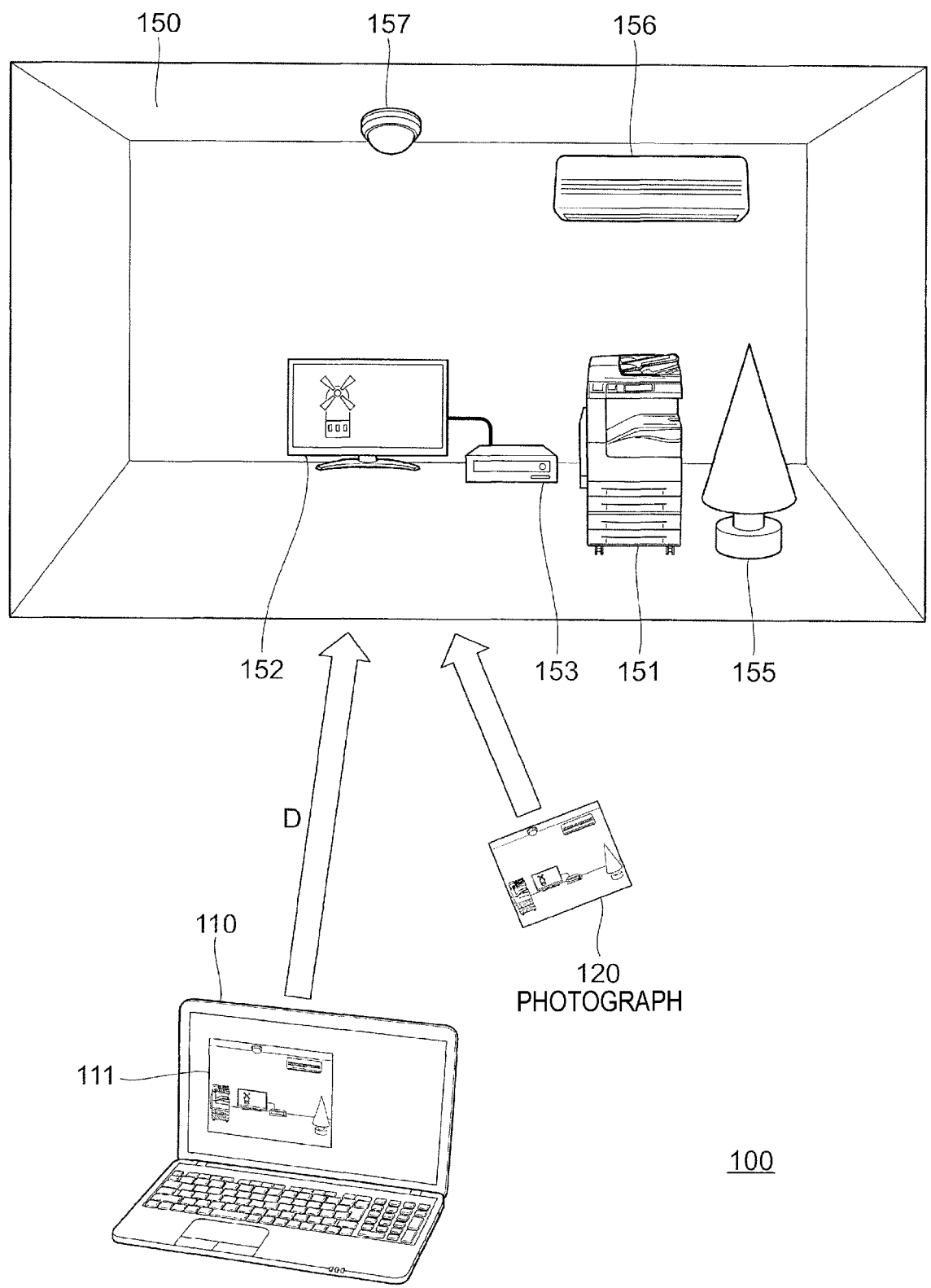
FIG. 1 is a view illustrating a configuration example of an image processing system used in a first exemplary embodiment.

FIG. 1 is a view illustrating a configuration example of the image processing system 100 used in the present exemplary embodiment.

The image processing system 100 includes a laptop computer 110 used to display a still image 111 (for example, electronic photograph), a photograph 120 obtained by printing the still image 111 on paper, and a real device existing within a real space 150 corresponding to a capturing place of the still image 111.

The computer 110 may exist in a space which is the same as or different from the real space 150.

FIG. 1 illustrates an example in which the appearance of the computer 110 is a notebook computer. The appearance of the computer 110 is not limited to the notebook computer but may be a desktop computer, a smart phone, a game machine, or the like.

It is assumed that the real space 150 illustrated in FIG. 1 is an indoor room. In the real space 150, not only devices but also a plant exist.

The real space 150 includes: an image forming apparatus 151 that has a function of forming an image on a recording material such as paper and a function of optically reading an image of a document; a display device 152 that displays a broadcast program or the like; a recording and reproducing device 153 that records a moving image or sound (hereinafter, referred to as a "moving image, etc.") in a recording medium or reproduces a moving image, etc. from a recording medium; a planted tree 155; an air conditioner 156; and a surveillance camera 157.

Hereinafter, a description will be made of the configuration and operation of the image forming apparatus 151 as a representative example among plural devices existing in the real space 150.

Figure 2:
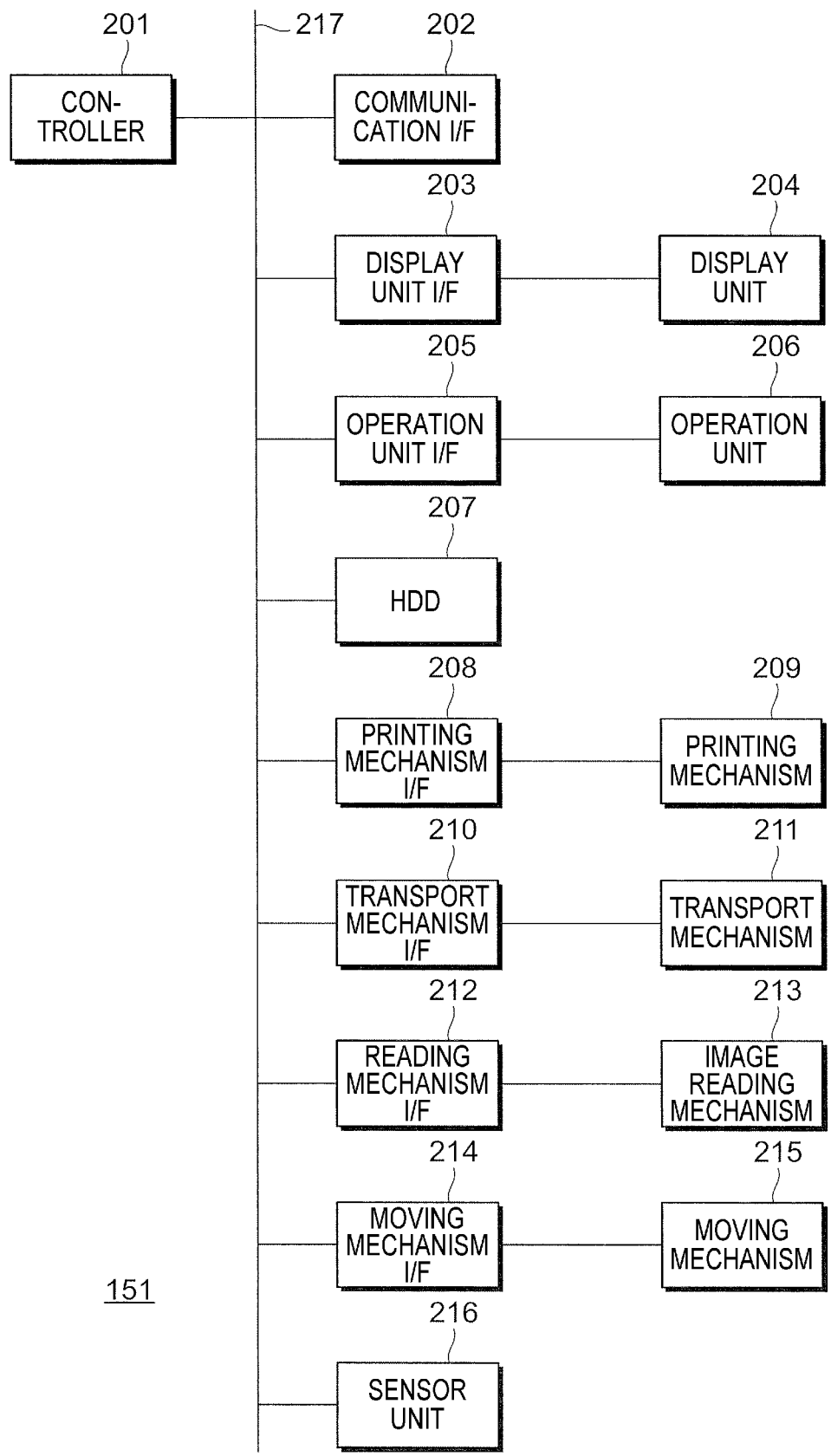
FIG. 2 is a block diagram illustrating an example of a hardware configuration of an image forming apparatus.

FIG. 2 is a block diagram illustrating an example of a hardware configuration of the image forming apparatus 151.

The image forming apparatus 151 includes a controller 201, a communication interface (communication I/F) 202 used for communication with the outside, a display unit interface (display unit I/F) 203 that displays an operation screen and the like on a display unit 204, and an operation unit interface (operation unit I/F) 205 that receives a user's operation on an operation unit 206.

The controller 201 and each unit are connected to each other via a bus 217.

The controller 201 is a so-called computer, and is configured with a central processing unit (CPU), a read only memory (ROM), and a random access memory (RAM) which are not illustrated.

The ROM stores a basic input/output system (BIOS) and firmware to be executed by the CPU. The RAM is used as the work area of the program. The controller 201 controls the operation of each unit through execution of firmware or the like.

The communication interface (communication I/F) 202 is configured with a communication device used to communicate with, for example, a mobile phone network and a wireless communication network (Intranet of Things (IOT) network, a home network, or the like). For example, WiFi (registered trademark), Bluetooth (registered trademark), and ZigBee (registered trademark) are used in the communication.

The display unit 204 is configured with, for example, a liquid crystal display, an organic EL display, or the like.

The operation unit 206 is configured with, for example, operation buttons, operation keys, a touch panel, and the like.

The image forming apparatus 151 includes a hard disk device (HDD) 207 that is an example of a nonvolatile storage device, and a printing mechanism interface (printing mechanism I/F) 208 that drives a printing mechanism 209 for printing an image by, for example, an electrophotographic process or an inkjet process.

Here, the printing mechanism 209 has printing units corresponding to four colors of yellow (Y), magenta (M), cyan (C), and black (K). Each printing unit of the electrophotographic process includes a photoconductor drum, a charging unit that charges the surface of the photoconductor drum, an exposure unit that irradiates the charged photoconductor drum with a laser beam to draw an image, a developing unit that develops the drawn image as a toner image, a transfer unit that transfers the toner image to a sheet P, and a fixing device that fixes the transferred toner image onto the sheet P.

The image forming apparatus 151 includes: a transport mechanism interface 210 that drives a transport mechanism 211 for transporting a sheet, which is a recording material; a reading mechanism interface (reading mechanism I/F) 212 that drives an image reading mechanism 213 for reading an image from the photograph 120 (see FIG. 1); a moving mechanism interface (moving mechanism I/F) 214 for driving a moving mechanism 215; and a sensor unit 216 that detects the presence of an obstacle (people or other objects) present in a traveling direction.

The image reading mechanism 213 here is a so-called scanner.

The moving mechanism 215 is disposed, for example, on the bottom surface of a housing. The moving mechanism 215 has, for example, four wheels used for moving the main body, four motors that drive the respective wheels, a steering mechanism that adjusts the moving direction, and the like. The moving mechanism 215 is an example of a moving unit.

The sensor unit 216 uses an optical unit that measures scattered light generated by another article existing around the sensor unit 216 when irradiating the article with, for example, a pulsed laser beam (electromagnetic wave), thereby analyzing a distance to the other article and the property of a target article. This type of optical unit is called a light detection and ranging (LIDAR).

The sensor unit 216 may be a camera for capturing the moving direction. The camera is configured with, for example, a charge coupled device (CCD) sensor, a complementary metal oxide semiconductor (CMOS) sensor, or the like. By processing image data captured by the camera, an obstacle may be detected and the distance to the obstacle may be calculated.

Figure 3:
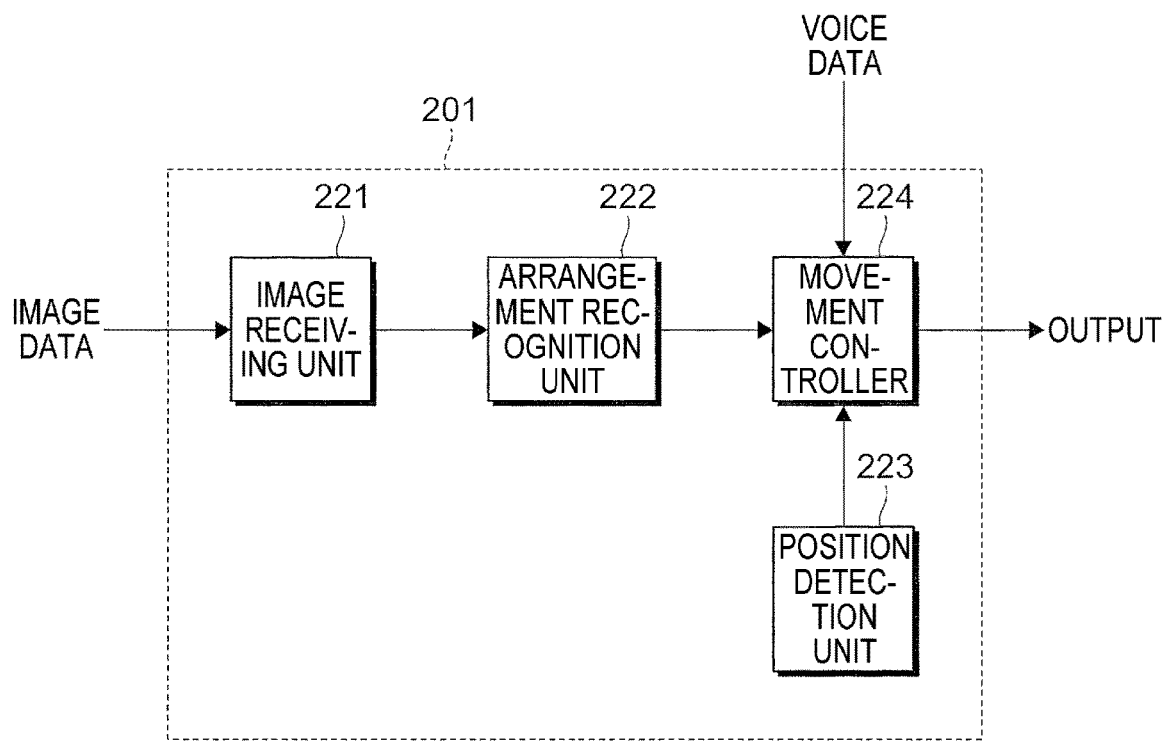
FIG. 3 is a view illustrating an example of a functional configuration of a controller constituting an image forming apparatus according to the first exemplary embodiment.

FIG. 3 is a view illustrating an example of a functional configuration of the controller 201 constituting the image forming apparatus 151 (see FIG. 1) according to the first exemplary embodiment.

The controller 201 of the present exemplary embodiment includes: an image receiving unit 221 that receives image data from the outside; an arrangement recognition unit 222 that recognizes the arrangement of objects in the received image; a position detection unit 223 that detects the position of its own apparatus in the real space 150; and a movement controller 224 that controls the movement of its own apparatus based on the recognized arrangement.

The image receiving unit 221 here is an example of a receiver, and the arrangement recognition unit 222, the position detection unit 223, and the movement controller 224 are an example of a controller.

The image receiving unit 221 receives the image data of the photograph 120 (see FIG. 1) read by the image reading mechanism 213 (see FIG. 2) or image data corresponding to an image file received from the computer 110 (see FIG. 1) through the communication interface (communication I/F) 202 (see FIG. 2).

The arrangement recognition unit 222 processes the image data to recognize the objects included in the image (electronic photograph) and recognizes the position relationship between the objects in the image.

The arrangement recognition unit 222 recognizes the objects in the image using, for example, a method of comparing template images (at least the image of its own apparatus) accumulated in the image database with the input image data or a method of inputting the input image to a discrimination program prepared for each object (which is prepared in advance using a technique such as machine learning or deep learning).

Further, the arrangement recognition unit 222 collects information as to whether an object is located on the left side or the right side with respect to another object in the image, information as to whether a position where the object is in contact with a floor surface is the front side or the back side with respect to a position where another object is in contact with the floor surface, and the like, and recognizes such information as the position relationship between the objects.

In addition, depth information may be specified, for example, by converting the image data into a hue, saturation, value (HSV) color space, and then calculating a variance value related to hue, saturation, and brightness in the color space as a feature quantity.

The arrangement recognition unit 222 here also has a function of performing character recognition on a text described in an image (electronic photograph).

Further, when a floor plan (which will be described later) is available and the position of each object is specified on the floor plan using the image or the like of the surveillance camera 157 (see FIG. 1), the arrangement recognition unit 222 may acquire the position relationship between the objects as position information on the floor plan.

The position detection unit 223 recognizes the position of its own apparatus based on, for example, the floor plan prepared in advance and the image data acquired from the surveillance camera 157 (see FIG. 1).

Here, the floor plan may be prepared, for example, by moving the image forming apparatus 151 in which the sensor unit 216 (LIDAR) is enabled within the real space 150, by using an application (for example, MagicPlan (trademark)) for performing 360°-capturing while a user stands at the center of the real space 150 and inputs positions of the corners of the room, or by acquiring a design book.

Further, the position detection unit 223 may adopt an object captured by the surveillance camera 157 as a feature point and determine the position of its own apparatus in the real space 150 based on the position relationship between the feature point and its own apparatus. For example, Intranet of Things (IOT) network communication is used for communication with the surveillance camera 157.

In addition, when an indoor GPS system is available, position information detected by the indoor GPS system may be used as the position of its own apparatus.

The movement controller 224 controls the movement of the moving mechanism 215 so as to approximate to the arrangement of the images recognized by the arrangement recognition unit 222. For example, the movement controller 224 may move its own apparatus so as to satisfy the position relationship with the other article recognized by the arrangement recognition unit 222 (corresponding to an object recognized on the screen). Further, for example, when a position in the real space 150 is physically specified by the arrangement recognition unit 222, the movement controller 224 may adopt the specified position as a target point and move its own apparatus.

In addition, when a condition related to movement (for example, "slowly") is given from the arrangement recognition unit 222, the movement controller 224 controls its own apparatus so as to satisfy the given condition.

Further, the movement controller 224 may have a function of detecting a condition related to movement by performing voice recognition on voice data given from a microphone (not illustrated). The function of executing voice recognition may be provided separately from the movement controller 224.

Example of Printed Matter (Electronic Photograph) Used for Control of Movement

Figure 4:
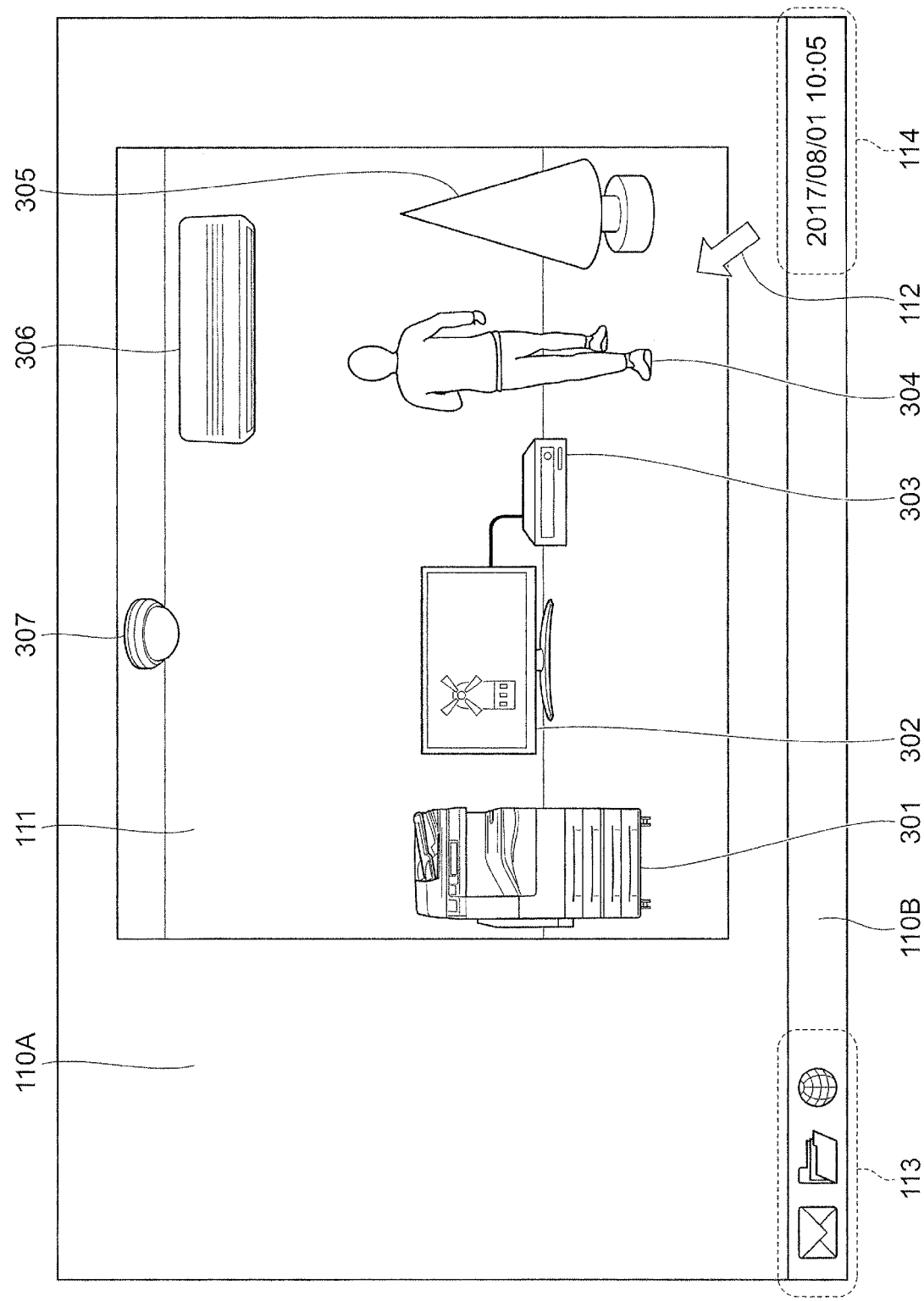
FIG. 4 is a view for explaining a state in which a cleaning range is input to a still image displayed on an operation screen of a computer using a mouse pointer.

FIG. 4 is a view for explaining how to input the cleaning range using a mouse pointer 112 to the still image 111 displayed on an operation screen 110A of the computer 110 (see FIG. 1).

On the operation screen 110A, the still image 111 obtained by capturing the real space 150 (see FIG. 1) is displayed in the form of a small screen (window).

The still image 111 illustrated in FIG. 4 includes an image 301 of the image forming apparatus, an image 302 of the display device, an image 303 of the recording and reproducing device, an image 304 of a person, an image 305 of the planted tree, an image 306 of the air conditioner, and an image 307 of the surveillance camera.

A task bar 110B is provided at the bottom of the operation screen 110A, and icons 113 of three active applications and a current time 114 are displayed on the task bar 110B.

The still image 111 illustrates a state of the real space 150 at a certain time (see FIG. 1). Therefore, the position of the image 304 of the person is generally different from the position of the person (for example, he/she is not present in FIG. 1) at the current time.

In addition, the persons existing in the real space 150 and the number of persons at the time of capturing the still image 111 are different from those at the current time.

FIG. 4 illustrates the still image 111 displayed on the operation screen 110A as an example. It should be noted that the content of the still image 111 is the same as the content of the photograph 120 (see FIG. 1).

When it is desired to move the position of the image forming apparatus 151 (see FIG. 1) in the real space 150, the user controls the computer 110 (see FIG. 1) to transmit an image file corresponding to the still image 111 to the image forming apparatus 151.

Figure 5:
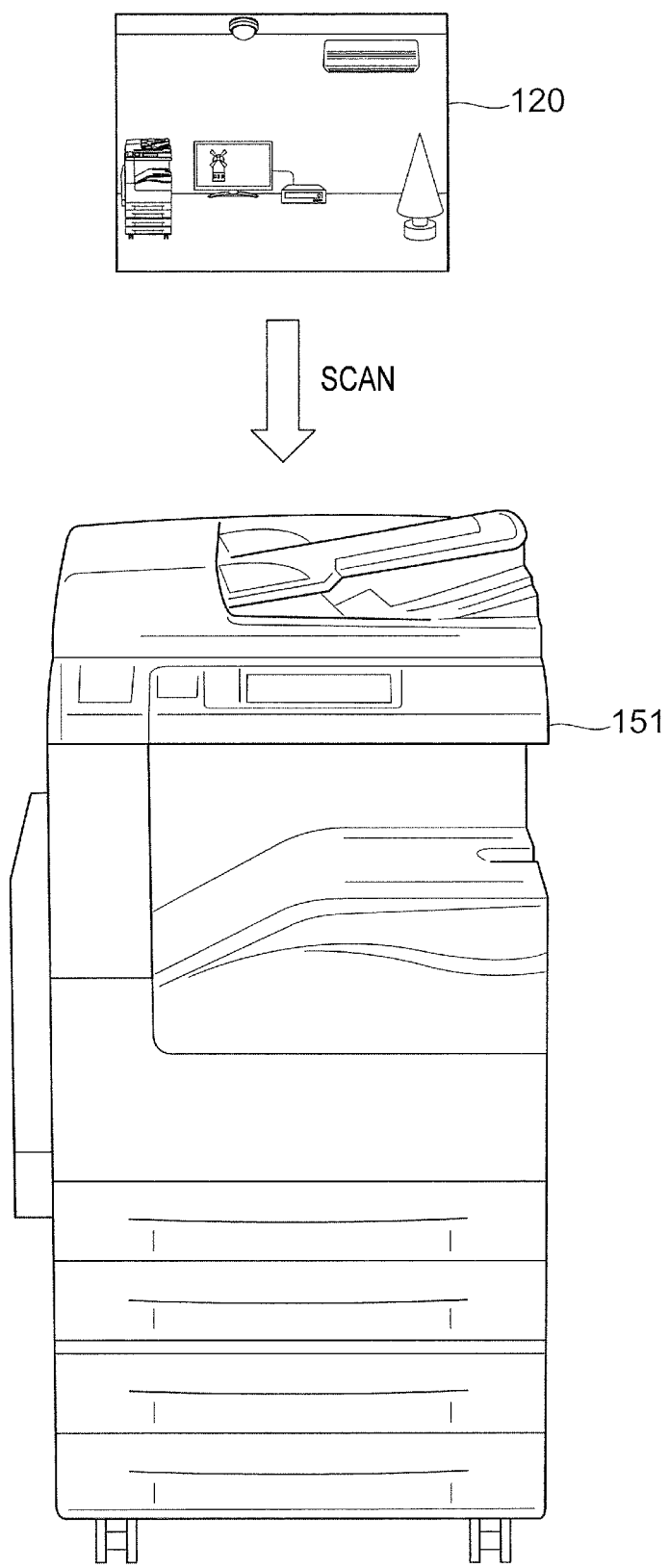
FIG. 5 is a view for explaining reading of a photograph by a so-called scanner.

Alternatively, as illustrated in FIG. 5, the photograph 120 (see FIG. 1) is read to the image forming apparatus 151 using the image reading mechanism 213 (see FIG. 2).

FIG. 5 is a view for explaining reading of the photograph 120 by a so-called scanner.

When a condition relating to movement is instructed by text, the condition is written on the still image 111 (see FIG. 4) or the photograph 120 at this point.

Example of Processing Operation

Here, an example of processing operations executed by the image forming apparatus 151 (see FIG. 1) will be described with reference to FIG. 6.

Figure 6:
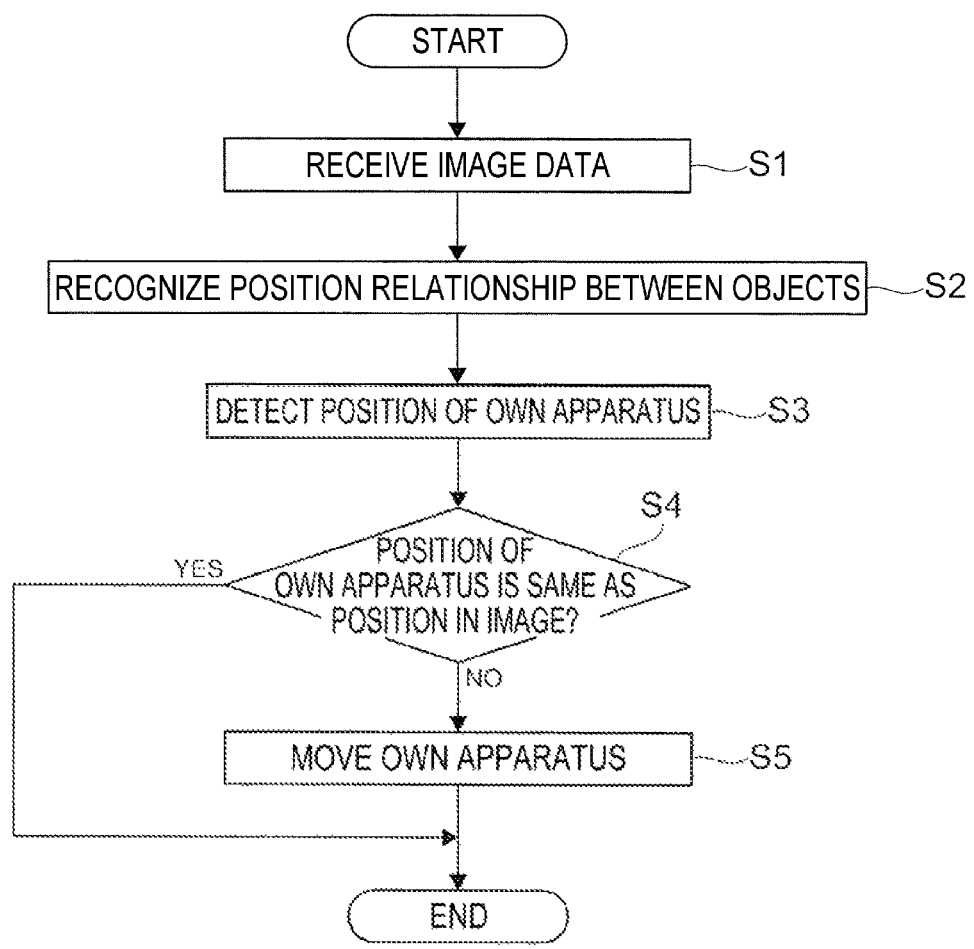
FIG. 6 is a flowchart for explaining a processing operation executed by the image forming apparatus used in the first exemplary embodiment.

FIG. 6 is a flowchart of the processing operation executed by the image forming apparatus 151 used in the first exemplary embodiment.

First, the controller 201 (see FIG. 3) receives the image data corresponding to the still image 111 (see FIG. 1) or the photograph 120 (see FIG. 1) through the image receiving unit 221 (Step 1).

Next, the controller 201 recognizes the position relationship between the objects included in the image corresponding to the image data (electronic photograph) using the function of the arrangement recognition unit 222 (see FIG. 3) (Step 2). In addition, when the object corresponding to the own apparatus is not included in the image (electronic photograph), the controller 201 terminates the processing operation without executing the subsequent process.

Subsequently, the controller 201 detects the position of its own apparatus through the function of the position detection unit 223 (see FIG. 3) (step 3).

Thereafter, the controller 201 determines whether the detected position of its own apparatus is the same as the position in the image (Step 4).

When the positions are the same (an affirmative result is obtained in Step 4), the controller 201 terminates the processing operation. On the other hand, when the positions are different from each other (a negative result is obtained in Step 4), the controller 201 uses the function of the movement controller 224 (see FIG. 3) to move its own apparatus so as to be closer to the position in the image (Step 5).

It should be noted that in the present exemplary embodiment, the length of the power cable of the image forming apparatus 151 is ignored.

Figure 7A:
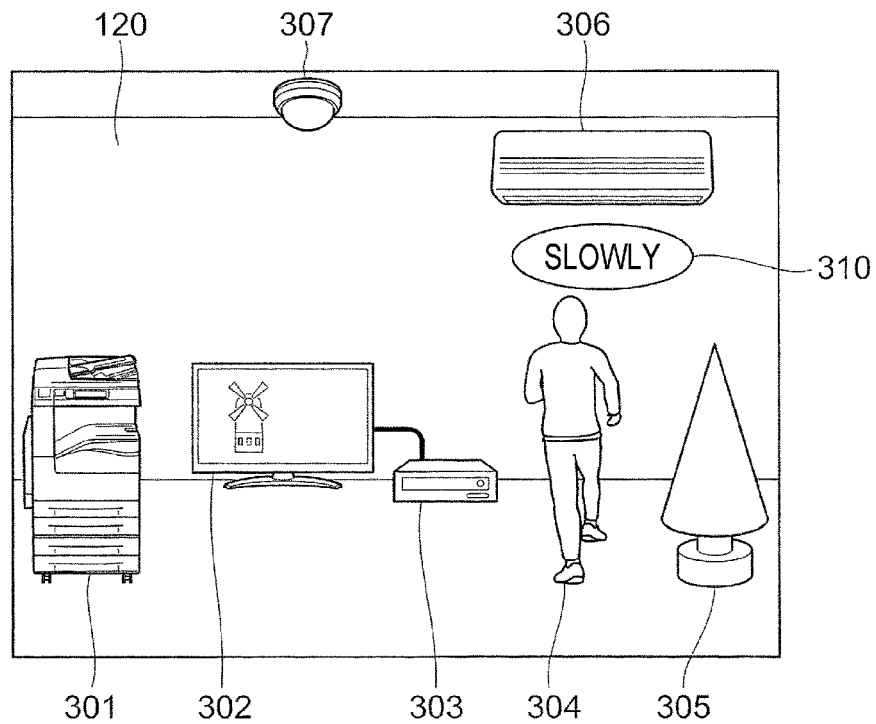
Figure 7B:
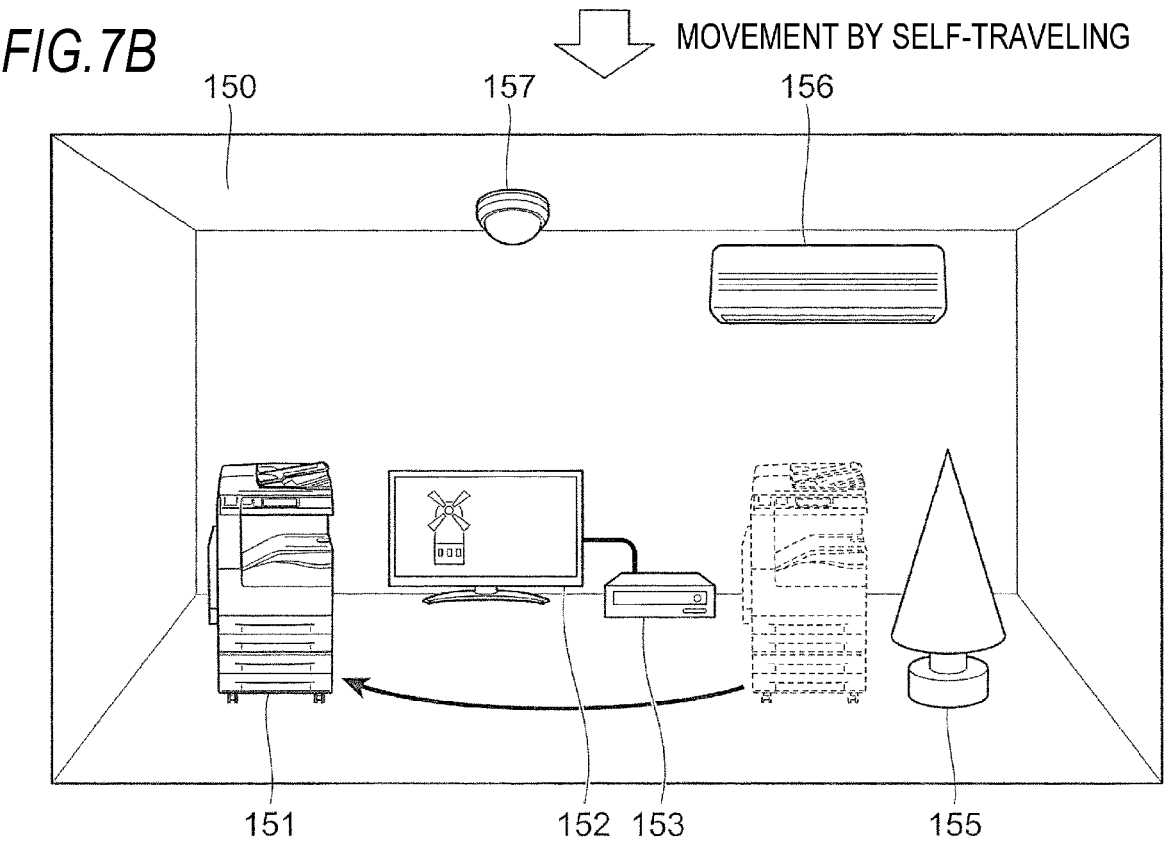

FIGS. 7A and 7B are views for explaining the operation state according to the present exemplary embodiment. FIG. 7A illustrates an example of the photograph 120 used for moving the image forming apparatus 151, and FIG. 7B illustrates a state of moving the image forming apparatus 151 in the real space 150.

In the case of the photograph 120 illustrated in FIG. 7A, the image 301 of the image forming apparatus 151 is located at the left end. Further, a symbol 310 in which letters "slowly" are surrounded by a circle is written on the photograph 120. Here, the letters are surrounded by the circle so that the image forming apparatus 151 may recognize that the letters are an instruction from the user.

In the present exemplary embodiment, the writing of "slowly" indicates a low speed mode as the moving speed of the image forming apparatus 151. In addition, examples of the writing include "at high speed" and the like. For example, "at high speed" is used when instructing a high speed mode as the moving speed.

In FIGS. 7A and 7B, since the controller 201 (see FIG. 3) operates under a rule that letters surrounded by a circle is recognized as an instruction from the user, when another predetermined rule exists, the user makes writing so as to satisfy the applicable rule. For example, rectangular figures and star figures may be combined with numbers.

In the case of the real space 150 illustrated in FIG. 7B, the position of the image forming apparatus 151 before the movement is initiated is indicated by broken lines.

In this example, at the time of instructing the image forming apparatus 151 to move using the photograph 120, the image forming apparatus 151 is located between the recording and reproducing device 153 and the planted tree 155 and adjacent to the planted tree 155 (see FIG. 1).

This position relationship is different from the position relationship illustrated in the photograph 120.

Therefore, the image forming apparatus 151 in the real space 150 moves by self-traveling to the position illustrated in the photograph 120 as indicated by an arrow. Further, the movement here is executed at the low speed according to the instruction of the symbol 310.

As the accuracy of the position information used in the image forming apparatus 151 becomes higher, the position of the image forming apparatus 151 in the real space 150 also becomes closer to the position of the image 301 of the image forming apparatus in the photograph 120.

Even when the accuracy of the position information is low, the image forming apparatus 151 moves at least to the left side of the display device 152.

Effect of Exemplary Embodiment

By the user only giving, for example, the photograph 120 (see FIG. 1) obtained by capturing the real space 150 (see FIG. 1) in which the image forming apparatus 151 is present, to the image forming apparatus 151, he/she achieves a work of moving the image forming apparatus 151 in the real space 150. That is, the photograph 120 may be used as a type of an instruction unit.

Further, although the accuracy of positioning depends on the number of feature points and the position information included in the photograph 120, the work amount required for the user is reduced.

For example, when there are plural photographs 120 (or plural pieces of image data D) which are different from each other in the arrangement of the image forming apparatus 151 in the real space 150, the user may implement the movement of the image forming apparatus 151 in the real space 150 by only giving the desired photograph 120 to the image forming apparatus 151.

In addition, when a camera for capturing the surroundings is mounted on the image forming apparatus 151, it is possible to instruct the movement of the image forming apparatus 151 only by holding the photograph 120 in front of the camera.

In the foregoing description, the position of the image forming apparatus 151 is moved. The present exemplary embodiment is applicable to the movement of another device having a mechanism for self-traveling.

Second Exemplary Embodiment

In the present exemplary embodiment, a description will be made of a case where the position of another device is moved using the photograph 120 (FIG. 1) or the like.

Figure 8:
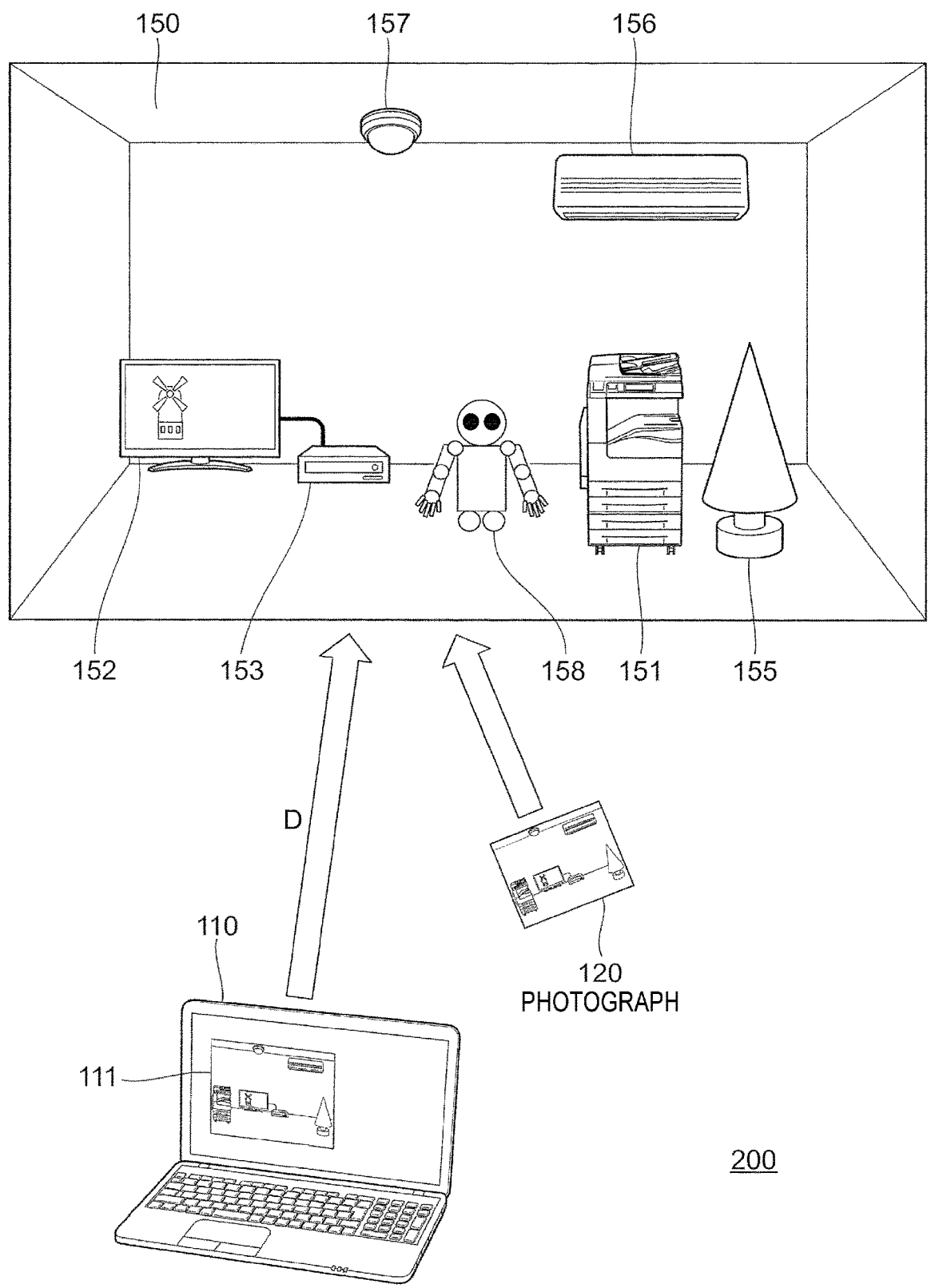
FIG. 8 is a view illustrating a configuration of an image processing system according to a second exemplary embodiment.

FIG. 8 is a view illustrating the configuration of an image processing system 200 according to a second exemplary embodiment.

In FIG. 8, portions corresponding to those in FIG. 1 are denoted by corresponding reference numerals.

In the image processing system 200 according to the present exemplary embodiment, a humanoid robot 158 exists in the real space 150. The second exemplary embodiment is different from the first exemplary embodiment in that this robot 158 plays a role of moving another article.

Also, in the present exemplary embodiment, the photograph 120 or the image data D are used for the movement instruction.

The humanoid robot 158 includes respective portions of a body, a head, arms, hands, and feet, which are connected to each other by link mechanisms (mechanical mechanisms). For example, the arms and the legs are connected to the body via the link mechanisms. The arms each has an upper arm and a forearm. Each arm is configured to vary the angles of the upper arm and the forearm via the link mechanisms so as to be able to carry an article. The adjustment of the angles of the upper arm and the forearm is implemented by driving by a motor. The upper arm and the forearm are able to support the assumed load. The hands are connected to the respective forearms via the link mechanisms. The hands have fingers that may be opened and closed so as to be able to grasp an article. Opening and closing of the fingers are implemented by driving by a motor. The hands are also able to support the assumed load. The feet are also used as a moving mechanism 410 (which will be described later). As for the feet, a structure capable of bending the feet may be adopted. The arms, hands, and feet are examples of the movable units.

Figure 9:
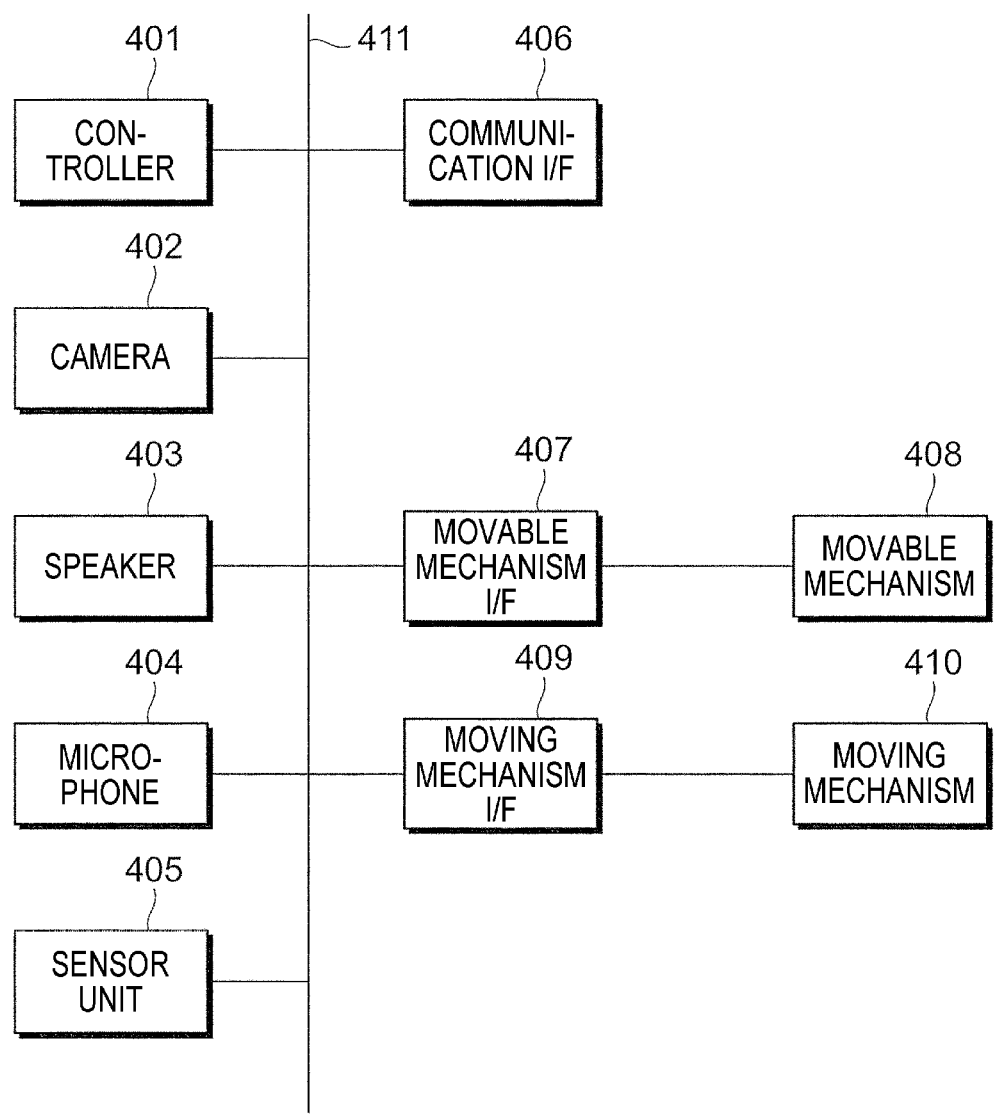
FIG. 9 is a block diagram illustrating an example of a hardware configuration of a humanoid robot.

FIG. 9 is block diagram illustrating an example of a hardware configuration of the humanoid robot 158.

The robot 158 includes a controller 401, a camera 402 for capturing surroundings, a speaker 403 for generating sound, a microphone 404 for collecting sound, a sensor unit 405 attached to each unit, a communication interface (communication I/F) 406 used for communication with the outside, a movable mechanism interface (movable mechanism I/F) 407 for driving a movable mechanism 408, and a moving mechanism interface (moving mechanism I/F) 409 for driving the moving mechanism 410.

The controller 401 and each unit are connected via a bus 411.

The controller 401 is a so-called computer, and is configured with a central processing unit (CPU), a read only memory (ROM), and a random access memory (RAM) which are not illustrated. The ROM stores a BIOS and firmware executed by the CPU. The RAM is used as the work area of the program. The controller 401 controls the operation of each unit through execution of firmware or the like.

The camera 402 is disposed, for example, on the head, and is used for capturing the surroundings of the robot 158 and the photograph 120 (see FIG. 8). The camera 402 is configured with, for example, a CCD sensor, a CMOS sensor, or the like.

The sensor unit 405 includes, for example, a sensor that detects the direction and an amount of movement of each unit in the link mechanism, a sensor that detects information on the environment of the real space 150 such as a temperature and a humidity, and the like. Further, the sensor unit 405 may include the LIDAR described in the first exemplary embodiment.

The communication interface (communication I/F) 406 is configured with a communication device used to communicate with, for example, a mobile phone network and a wireless communication network (Intranet of Things (IoT) network, a home network, or the like), and WiFi (registered trademark), Bluetooth (registered trademark), ZigBee (registered trademark), and the like are used for such communication.

The movable mechanism 408 includes the above-mentioned head, arms, hands, feet, and the like described above and is a group of plural structures connected by the link mechanisms. The position and direction of each unit of the movable mechanism 408 are changed by a driving force given from the motor. Examples of the operations of the movable mechanism 408 include operations such as gripping an article, holding an article, and supporting an article.

The moving mechanism 410 is a unit that moves the robot 158 in the real space 150 and is configured with wheels, a caterpillar, or the like. The moving mechanism 410 may be a walking mechanism.

Figure 10:
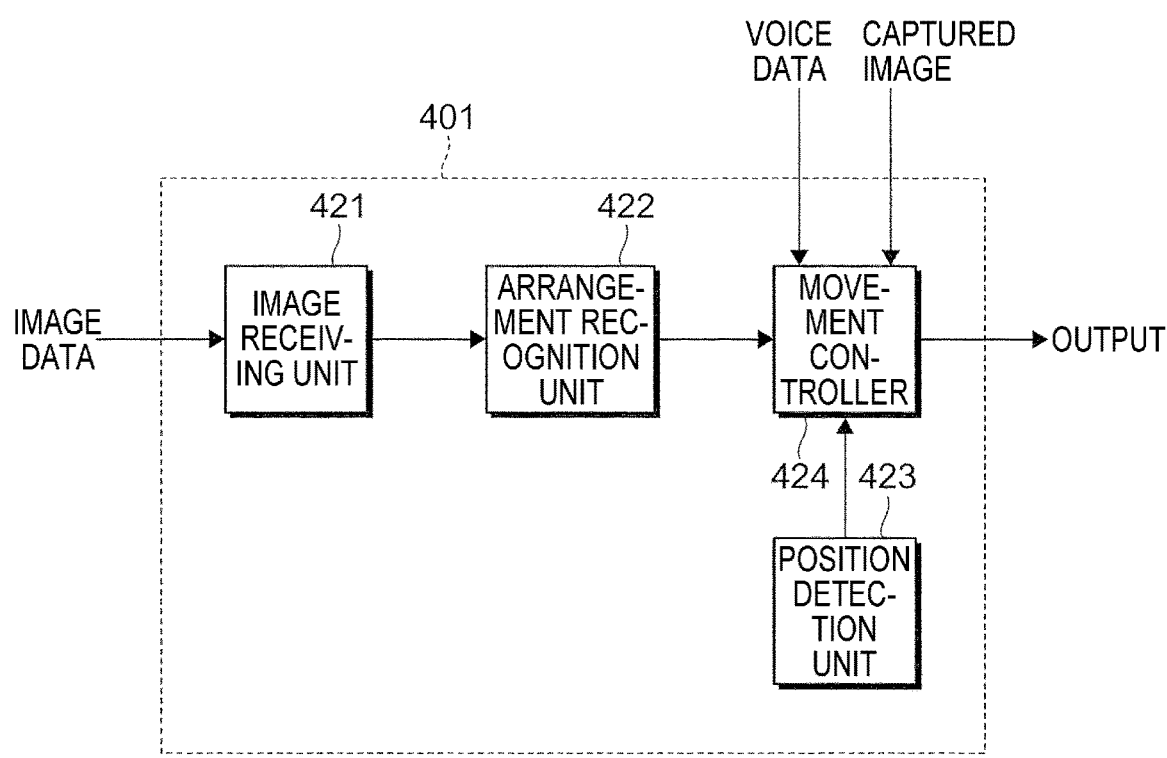
FIG. 10 is a view illustrating an example of a functional configuration of a controller constituting the robot.

FIG. 10 is a view illustrating an example of a functional configuration of the controller 401 constituting the robot 158 (see FIG. 1).

The controller 401 of the present exemplary embodiment includes: an image receiving unit 421 that receives image data from the outside; an arrangement recognition unit 422 that recognizes the arrangement of an object in the received image; a position detection unit 423 that detects the position of its own apparatus; and a movement controller 424 that controls movement of an article recognized as a movement target.

The image receiving unit 421 here is an example of a receiver, and the arrangement recognition unit 422, the position detection unit 423, and the movement controller 424 are an example of a controller.

The movement controller 424 has a function of controlling the operation based on the quality (condition) required for implementing the movement of an article.

The image receiving unit 421 of the present exemplary embodiment outputs, to the arrangement recognition unit 422, the image data of the photograph 120 (see FIG. 8) captured by the camera 402 or the image data which is received from the computer 110 through the communication interface (communication I/F) 406 (see FIG. 9) and which corresponds to the photograph 120 (see FIG. 8).

The arrangement recognition unit 422 also has a function of, when the image data includes a text that satisfies a specific condition, recognizing such a text as an instruction and outputting the recognized text to the movement controller 424. The instruction here may be given for each of articles to be moved (objects in the photograph 120). Alternatively, the instruction may be given without specifying an article.

The arrangement recognition unit 422 recognizes the objects included in the received image data, and recognizes the position relationship between the objects and the arrangement of each of the objects in the space corresponding to the image data.

As in the case of the arrangement recognition unit 222 (see FIG. 3) of the first exemplary embodiment, the arrangement recognition unit 422 of the present exemplary embodiment recognizes the objects in the image using, for example, a method of comparing template images accumulated in the image database with the input image data or a method of inputting the input image to a discrimination program prepared for each object (which is prepared in advance using a technique such as machine learning or deep learning).

The arrangement recognition unit 422 collects information as to whether an object is located on the left side or the right side with respect to another object in the image, information as to whether a position where the object is in contact with a floor surface is the front side or the back side with respect to a position where another object is in contact with the floor surface, and the like, and recognizes such information as the position relationship between the objects.

The arrangement recognition unit 422 places the objects recognized from the image data (photograph 120) on the floor plan by projecting the image data (photograph 120) onto the floor plan in such a manner that the feature points included in the floor plan corresponding to the real space 150 where its own apparatus exists and the feature points included in the image data (photograph 120) are associated with each other.

The floor plan here is stored in a database that may be accessed through, for example, a storage device (not illustrated) or the communication interface (communication I/F) 406 in the main body.

The floor plan may be generated based on, for example, position information and image information collected while the robot 158 moves in the real space 150. The floor plan may be generated through execution of, for example, an application (for example, MagicPlan (trademark)) for performing 360°-capturing while a user stands at the center of the real space 150 and inputs the positions of the corners of the room. Alternatively, the floor plan may be given as a design book of the real space 150.

In addition, when there is no floor plan, the arrangement recognition unit 422 may generate information on the relative position relationship between objects arranged on a plane as a floor plan.

The position detection unit 423 detects the position of its own apparatus in the real space 150. For example, the position detection unit 423 specifies the position of its own apparatus using an available floor plan.

The movement controller 424 compares the relationship between the arrangement of each object recognized by the arrangement recognition unit 422 and the arrangement in the real space 150, specifies as a movement target an object for which a difference in position exceeding a predetermined threshold value is detected, and controls its own apparatus so as to move the target article to a corresponding position on the photograph 120 (see FIG. 8).

For example, the movement controller 424 moves its own apparatus to the position of the article specified as the movement target, and then moves the target article to the target position by holding, supporting, pushing, or the like of the article. For example, when the target object is a lightweight article, the article is lifted by the hand and moved to the target point. A heavy article is basically moved to slip on the floor.

Further, the number of articles to be moved may be one or more.

In addition, when the movement condition is given by text or voice, the movement controller 424 prioritizes the instructed condition. For example, when a chair to be moved does not have casters, the movement controller 424 lifts and moves the chair.

It should be noted that when the instructed condition is not satisfied, the target article is moved by a feasible method. Specifically, for example, even when the movement instruction is "lift and transport," it is physically difficult to lift and transport the image forming apparatus 151.

When it is difficult to satisfy the condition instructed by the user, voice to inform this fact may be generated from the speaker 403 (see FIG. 9), and a notification may be sent to the computer 110 using the communication interface (communication I/F) 406.

Next, an example of a processing operation executed by the robot 158 (see FIG. 8) will be described with reference to FIG. 11.

Figure 11:
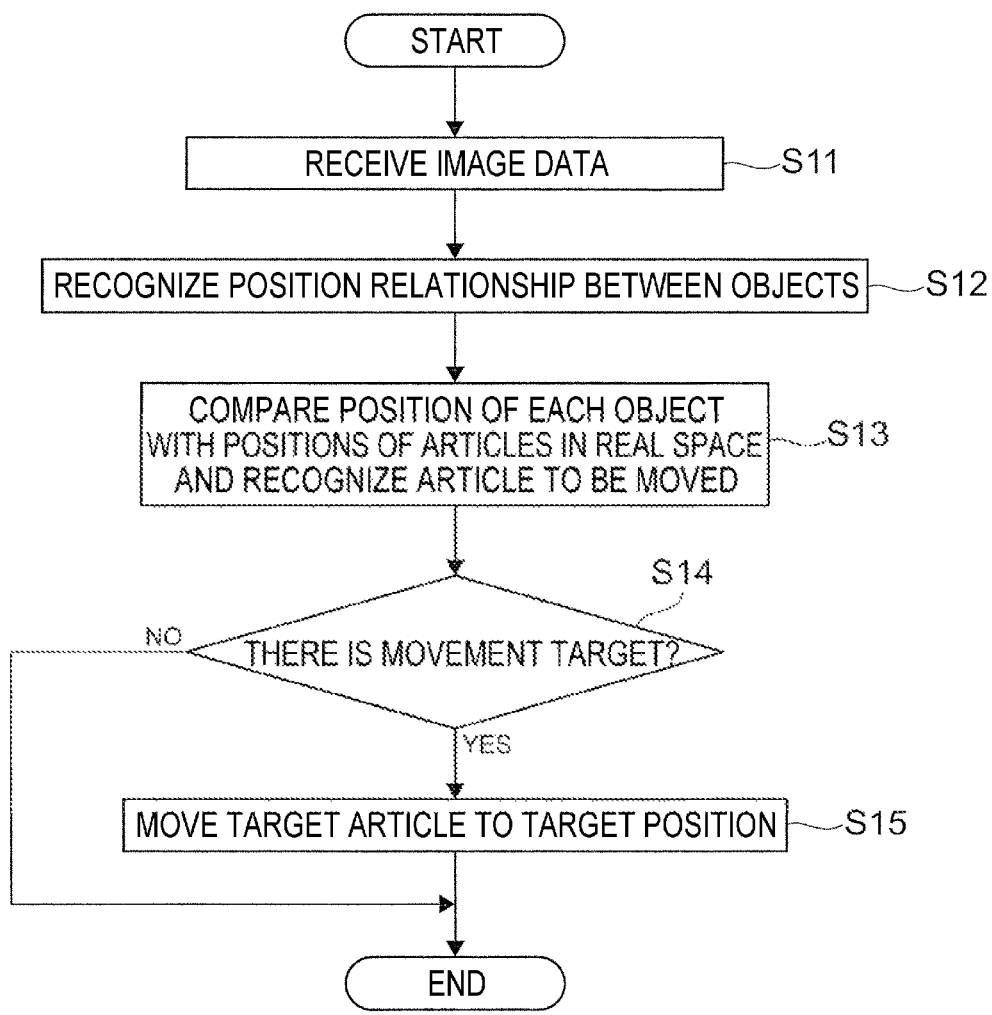
FIG. 11 is a flowchart for explaining a processing operation executed by the robot.

FIG. 11 is a flowchart for explaining a processing operation executed by the robot 158.

First, the controller 401 (see FIG. 10) receives image data corresponding to the still image 111 (see FIG. 8) or the photograph 120 (see FIG. 8) through the image receiving unit 421 (see FIG. 10) (Step 11). For example, the controller 401 receives the image data corresponding to the photograph 120 through the camera 402 (see FIG. 9) provided in the robot 158.

Next, the controller 401 recognizes the position relationship between the objects included in the image (electronic photograph) corresponding to the image data through the function of the arrangement recognition unit 422 (see FIG. 10) (Step 12).

Subsequently, the controller 401 compares the positions of the respective objects with the positions of the articles in the real space 150 (or compares the position relationships) through the function of the movement controller 424 (see FIG. 10), and recognizes an article to be moved (Step 13). The controller 401 recognizes, for example, an article of which a distance between the position of the object (electronic photograph side) on a common floor plan and the position of the article (real space side) exceeds a predetermined threshold value, as a movement target.

Thereafter, the controller 401 determines whether there is a movement target (Step 14). When the arrangement of the respective articles in the real space 150 is regarded as the same as the arrangement of the objects in the photograph 120, the controller 401 obtains a negative result in Step 14 and terminates the process. On the other hand, when the arrangement of any article in the real space 150 is different from the arrangement of the object in the photograph 120, the controller 401 obtains an affirmative result in Step 14 and moves the target article to a target position (Step 15). This movement operation is repeatedly executed until the movement of all the articles recognized as the movement targets is completed.

Figure 12A:
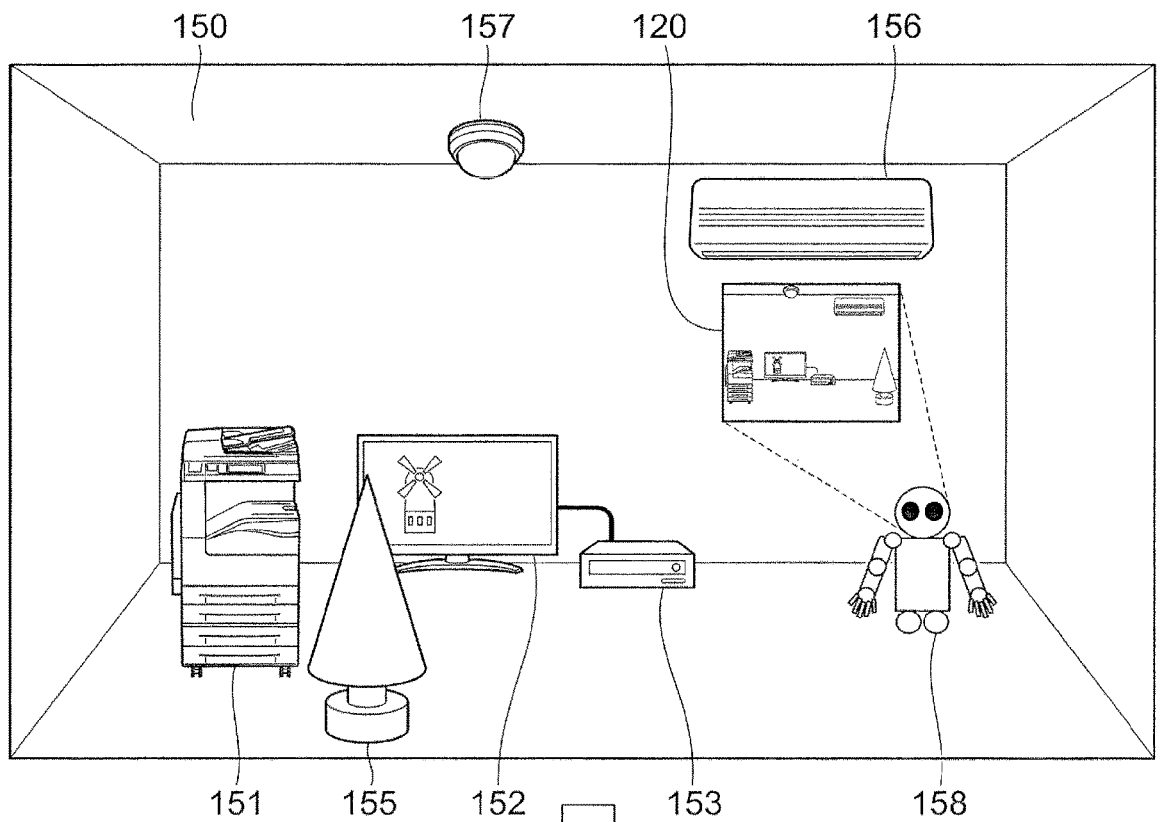
Figure 12B:
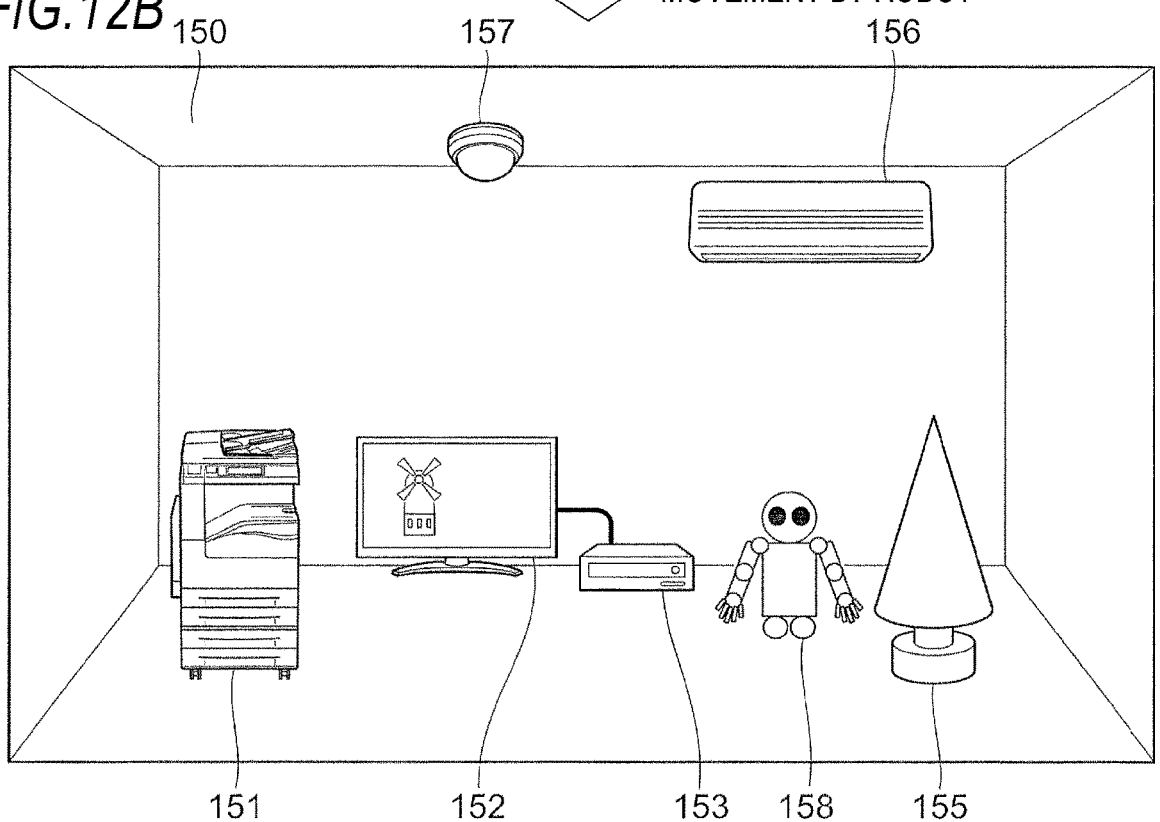

FIGS. 12A and 12B are views for explaining the operation state according to the second exemplary embodiment. FIG. 12A illustrates a scene where the photograph 120 is presented to the robot 158, and FIG. 12B illustrates a scene after the movement by the robot 158 is completed.

In the example of FIGS. 12A and 12B, the robot 158 moves the position of the planted tree 155 based on the position relationship of the respective objects specified by the photograph 120 (corresponding to the still image 111 illustrated in FIG. 4). Specifically, the planted tree 155 is located between the image forming apparatus 151 and the display device 152, and is moved from a position in the front of these to a position near the right side wall.

Further, as illustrated in FIGS. 12A and 12B, the display device 152 and the recording and reproducing device 153 which are connected to each other by a wiring cable, and devices connected to the power tap (outlet) may be excluded from the movement targets. The articles to be excluded may be instructed by the user by text or voice. Also, the articles to be excluded may be set in the application side as an exception to the movement target.

Figure 13:
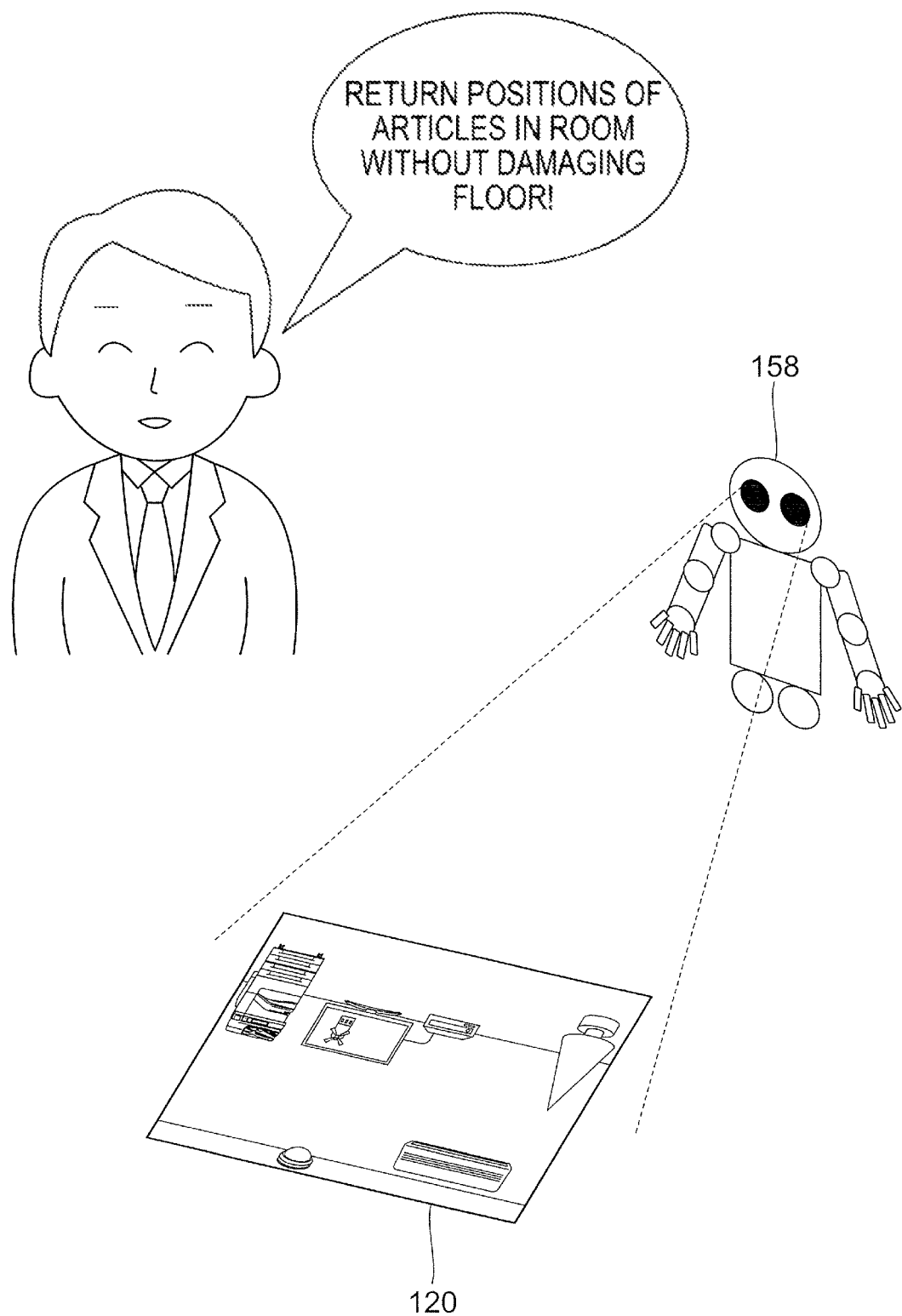
FIG. 13 is a view for explaining designation of a condition of movement using voice.

FIG. 13 is a view for explaining designation of a condition of movement using voice.

This designation is used to supplement the movement instruction using the above-described image. In FIG. 13, a man speaks to the robot 158, "Return the positions of articles in the room without damaging the floor."

When this condition is not given, the robot 158 may move the planted tree 155 (see FIGS. 12A and 12B) to slide on the floor surface. However, when the condition of this example is given, the robot 158 lifts up the planted tree 155 (assuming that the load of the planted tree 155 is small enough for the robot 158 lifts it up) and moves the planted tree 155 to the target point.

According to the present exemplary embodiment, the movement of the position of the planted tree 155 which does not have a mechanism for self-traveling may be implemented by presenting the photograph 120 (see FIGS. 12A and 12B) to the robot 158 having the movable mechanism 408 (see FIG. 9) and the moving mechanism 410 (see FIG. 9).

Third Exemplary Embodiment

In the present exemplary embodiment, a description will be made of a case where the state of an own apparatus is controlled using the photograph 120 (see FIG. 1). The control of the state of the own apparatus is an example of the operation of controlling the state in the real space.

Similarly to the first exemplary embodiment, the image forming apparatus 151 (see FIG. 1) will be described in the present exemplary embodiment. Therefore, a method of giving image data to the image forming apparatus 151 is the same as that in the first exemplary embodiment. For example, an input is performed by scanning the photograph 120 as illustrated in FIG. 5.

Figure 14:
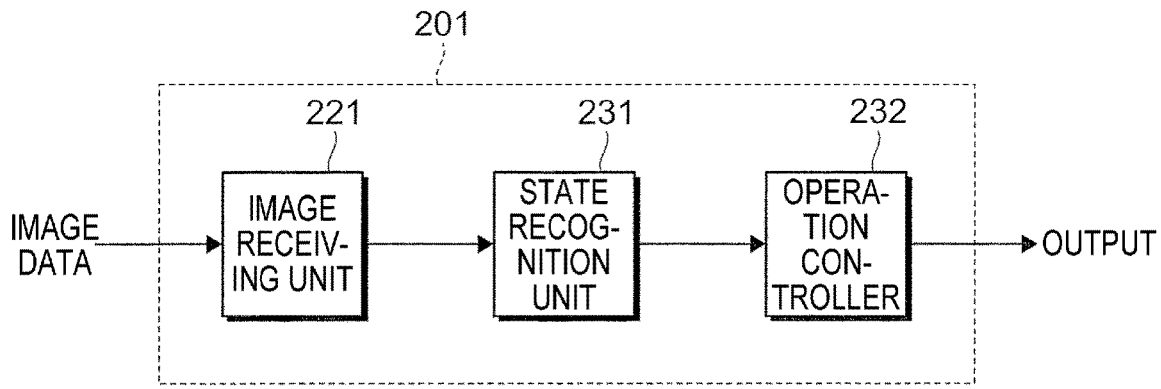
FIG. 14 is a view illustrating an example of a functional configuration of a controller constituting an image forming apparatus according to a third exemplary embodiment.

FIG. 14 is a view illustrating an example of the functional configuration of the controller 201 constituting the image forming apparatus 151 (see FIG. 1) according to the third exemplary embodiment.

In FIG. 14, portions corresponding to those in FIG. 3 are denoted by corresponding reference numerals.

The controller 201 of the present exemplary embodiment includes: an image receiving unit 221 that receives image data from the outside; a state recognition unit 231 that recognizes the state of its own apparatus included in the received image; and an operation controller 232 that controls the operation of its own apparatus based on the recognized state.

Here, the image receiving unit 221 is an example of a receiver, and the state recognition unit 231 and the operation controller 232 are an example of a controller.

The state recognition unit 231 uses the received image as a processing target and recognizes the state of its own apparatus through the appearance of the object corresponding to its own apparatus. The state to be recognized includes not only the state related to the appearance such as a difference in shape and position of a predetermined portion, but also the state related to the operation executed internally.

Further, the state related to the appearance includes, for example, whether a door or a tray is closed or opened.

In addition, examples of the state related to the operation include whether the operation is in a state to wait for selection of any one of arbitrary functions or a specific function is selected (the both are discriminated from each other based on the design of a user interface screen) and whether the power is turned on (discriminated based on the color of a power button).

The operation controller 232 compares the recognized state with the current state of its own apparatus and changes the state of its own apparatus to the recognized state when the current state is different from the recognized state. It should be noted that when the change involves a mechanical operation such as opening and closing of a door or a tray, it is necessary for the image forming apparatus 151 to be able to mechanically control the movement of a member.

Figure 15:
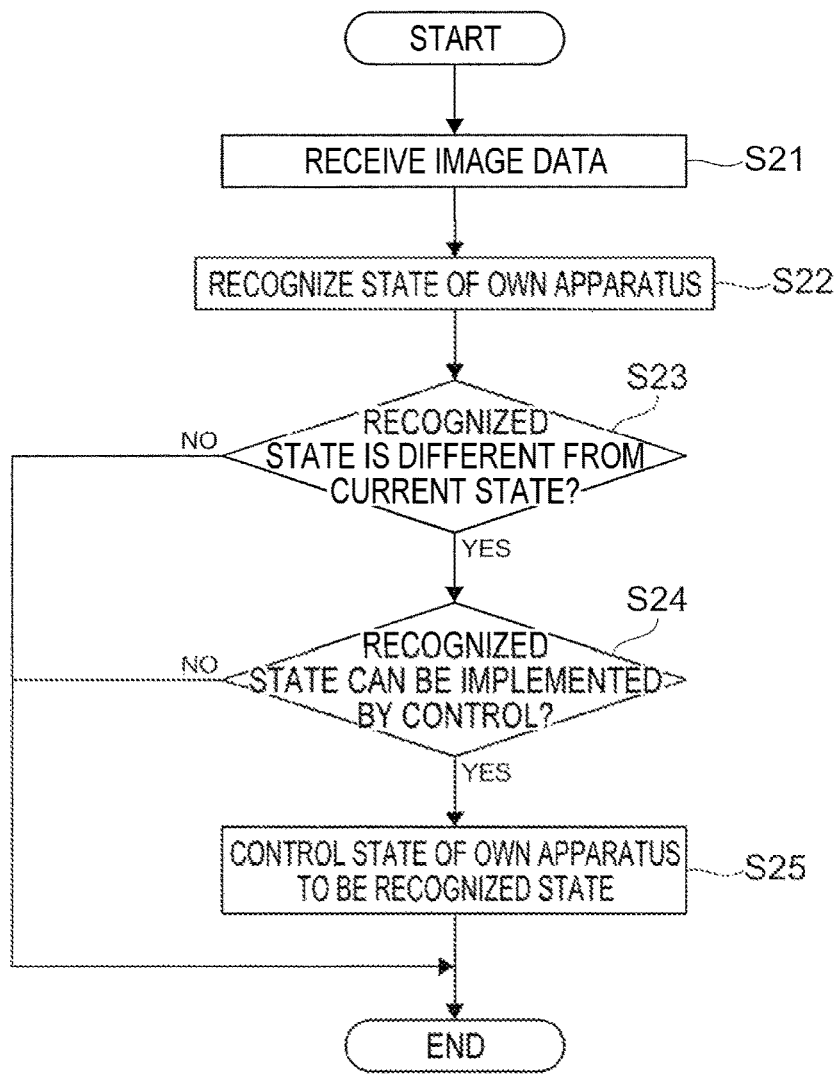
FIG. 15 is a flowchart for explaining a processing operation executed by the image forming apparatus used in the third exemplary embodiment.

FIG. 15 is a flowchart for explaining a processing operation executed by the image forming apparatus 151 (see FIG. 1) according to the third exemplary embodiment.

First, the controller 201 (see FIG. 14) receives image data corresponding to the still image 111 (see FIG. 1) or the photograph 120 (see FIG. 1) through the image receiving unit 221 (see FIG. 14) (Step 21).

Next, the controller 201 recognizes the state of its own apparatus through the function of the state recognition unit 231 (see FIG. 14) (Step 22). Here, the controller 201 recognizes the object corresponding to its own apparatus among one or plural objects recognized from the image data and recognizes the state of its own apparatus through the image processing on the object corresponding to its own apparatus. For example, the state of a front door and a paper tray is recognized. The portion to be recognized may be, for example, designated in advance. In this case, the designation may be performed by the user or may be set by the manufacturer in advance.

Subsequently, the controller 201 determines whether the recognized state is different from the current state (Step 23). When it is determined that there is no difference (a negative result is obtained in Step 23), the controller 201 terminates the process at this stage. On the other hand, when it is determined that a difference is found (an affirmative result is obtained in Step 23), the controller 201 further determines whether the recognized state may be implemented by a control (Step 24). This is because mechanical opening and closing requires a mechanism to drive the corresponding portion.

When the recognized state may not be implemented by a control (a negative result is obtained in Step 24), the controller 201 terminates the process at this stage. On the other hand, when the recognized state may be implemented by a control, the controller 201 controls the state of its own apparatus to be the recognized state (Step 25).

Figure 16A:
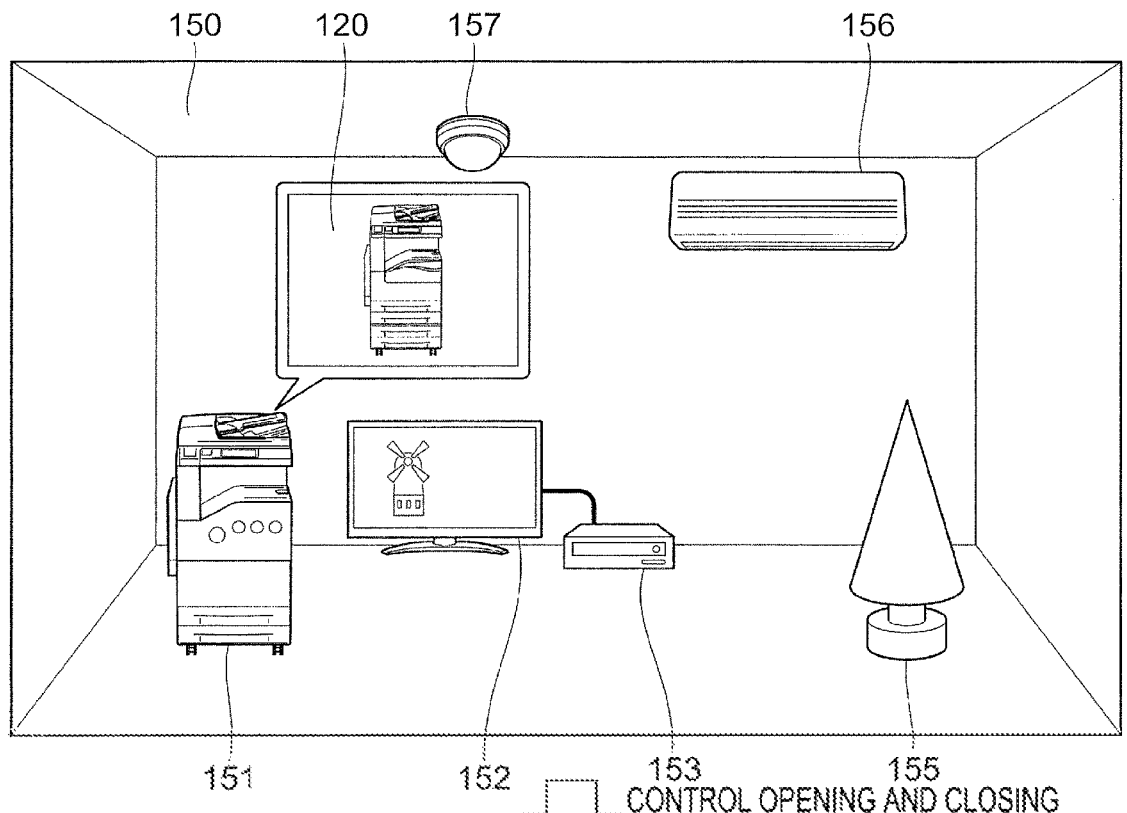
Figure 16B:
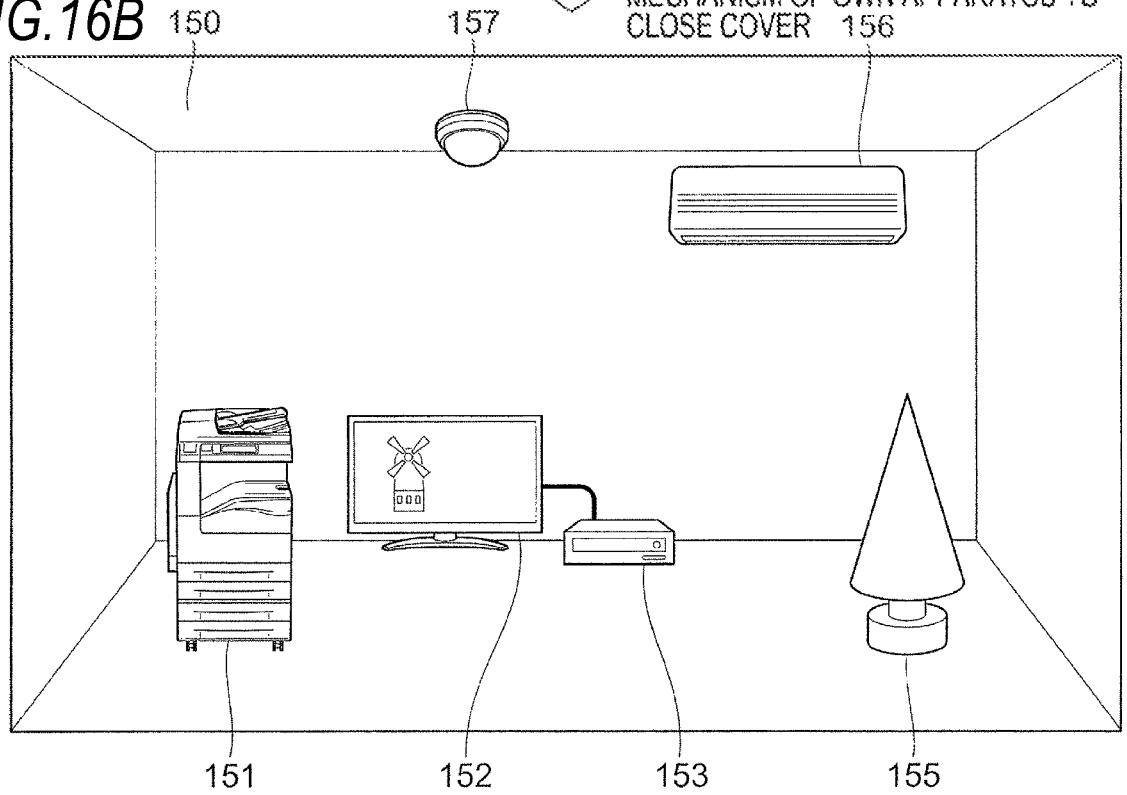

FIGS. 16A and 16B are views for explaining the operation state according to the third exemplary embodiment. FIG. 16A illustrates a scene where the photograph 120 is presented to the image forming apparatus 151, and FIG. 16B illustrates a scene after the state of the image forming apparatus 151 is changed.

In the example of FIGS. 16A and 16B, the front door of the image forming apparatus 151 is opened. Therefore, structural portions inside the apparatus (such as toner cartridges corresponding to four colors of yellow (Y), magenta (M), cyan (C), and black (K)) are in a state of being seen from the outside. The controller 201 of the image forming apparatus 151 recognizes a state in which the front door is opened.

In this state, when the photograph 120 in which the front door is closed is given, the controller 201 executes the above-described operation and drives a mechanism (not illustrated) to close the front door.

According to the present exemplary embodiment, when there is an image such as the photograph 120 (see FIG. 1) obtained by capturing the image forming apparatus 151 in a desired state, the user may implement the desired state without performing another operation by giving the image to the image forming apparatus 151.

By using this function, it is possible to control the image forming apparatus 151 to a desired state, for example, even from a remote place.

Fourth Exemplary Embodiment

In the present exemplary embodiment, a description will be made of a case where the state of another article is controlled using the photograph 120 (see FIG. 1). The control of the state of another article is an example of the operation of controlling the state in the real space.

Similarly to the second exemplary embodiment, the robot 158 (see FIG. 8) is used in the present exemplary embodiment.

Therefore, the basic configuration and the like of the robot 158 are the same as those in the second exemplary embodiment.

Figure 17:
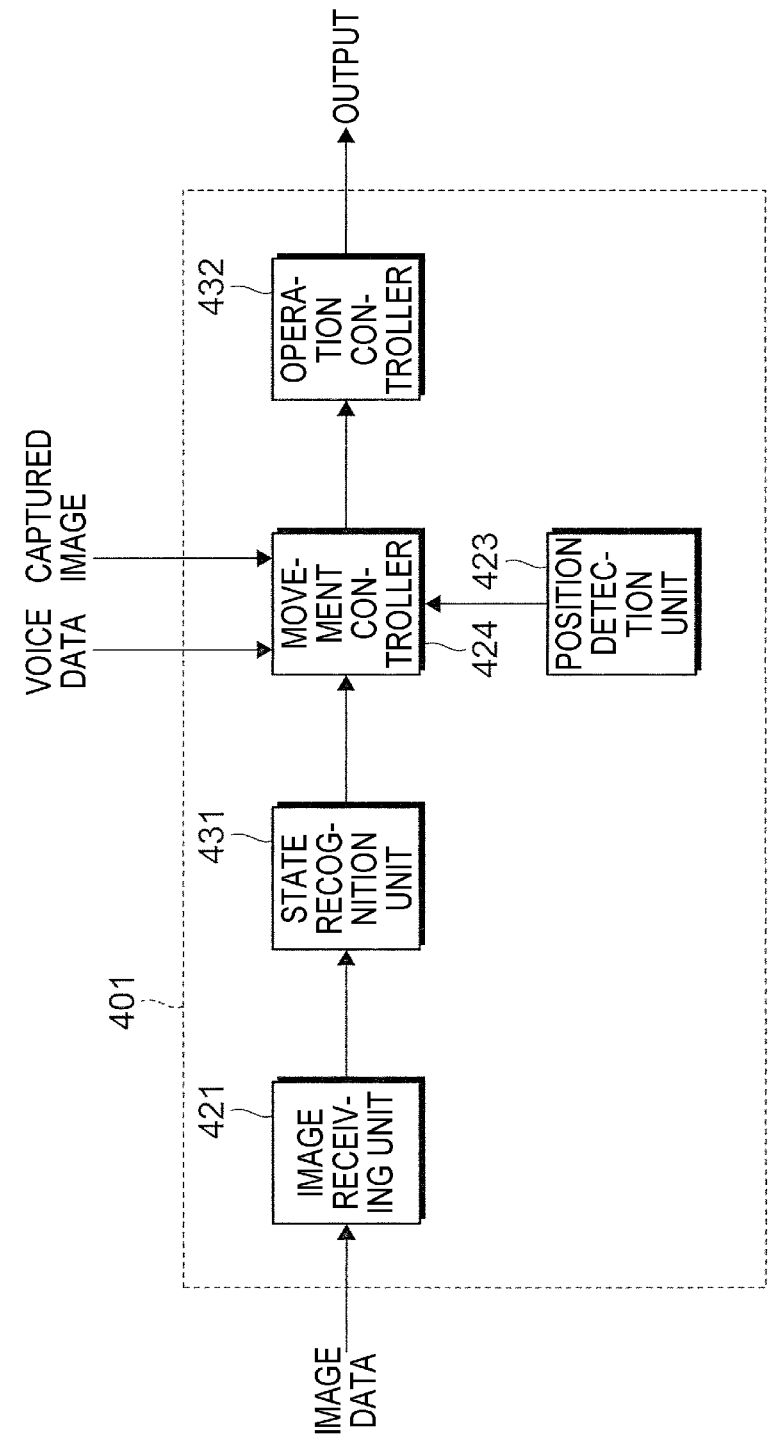
FIG. 17 is a view illustrating an example of a functional configuration of a controller constituting a robot according to a fourth exemplary embodiment.

FIG. 17 is a view illustrating an example of the functional configuration of a controller 401 constituting the robot 158 (see FIG. 8) according to the fourth exemplary embodiment.

In FIG. 17, portions corresponding to those in FIG. 10 are denoted by corresponding reference numerals.

The controller 401 of the present exemplary embodiment includes: an image receiving unit 421 that receives image data from the outside; a state recognition unit 431 that recognizes the state of each object included in the received image; a position detection unit 423 that detects the position of its own apparatus; a movement controller 424 that moves its own apparatus to the position of an article which is a state control target; and an operation controller 432 that controls the operation of its own apparatus so as to implement the recognized state.

Here, the image receiving unit 421 is an example of a receiver, and the state recognition unit 431, the position detection unit 423, the movement controller 424, and the operation controller 432 are an example of a controller.

The state recognition unit 431 processes the received image, recognizes an object, and recognizes the state of the recognized object. As described in the third exemplary embodiment, the recognized state includes not only the state related to the appearance, but also the state related to the operation executed internally.

Further, the state recognition unit 431 also executes a process of acquiring the current state of an article corresponding to the recognized object.

For example, when the article corresponding to the object is a device, the state recognition unit 431 recognizes the state of the target device from an image captured by the camera 402 (see FIG. 9) provided on its own apparatus or the internal information acquired by the IoT communication. In addition, when the article corresponding to the object does not have a communication function such as the planted tree 155 (see FIG. 8), the state recognition unit 431 recognizes the state of the target article, for example, from the image captured by the camera 402 (see FIG. 9) provided on its own apparatus.

Further, the current state of the article may be recognized using an image acquired from the surveillance camera 157 (see FIG. 8).

Further, the state recognition unit 431 compares the state of each object recognized from the image with the state of the corresponding article at the current time, and determines the article for which a difference is found to be a control target.

The movement controller 424 of the present exemplary embodiment controls the movement of the article that is determined by the state recognition unit 431 to be the control target, to a position. The position of the movement destination article may be detected using the image captured by the camera 402 (see FIG. 9) provided on its own apparatus, the position information of the article registered on the floor plan, or the image acquired from the surveillance camera 157 (see FIG. 8).

The operation controller 432 controls the operation of its own apparatus so as to change the state of the movement destination article to the recognized state.

Figure 18:
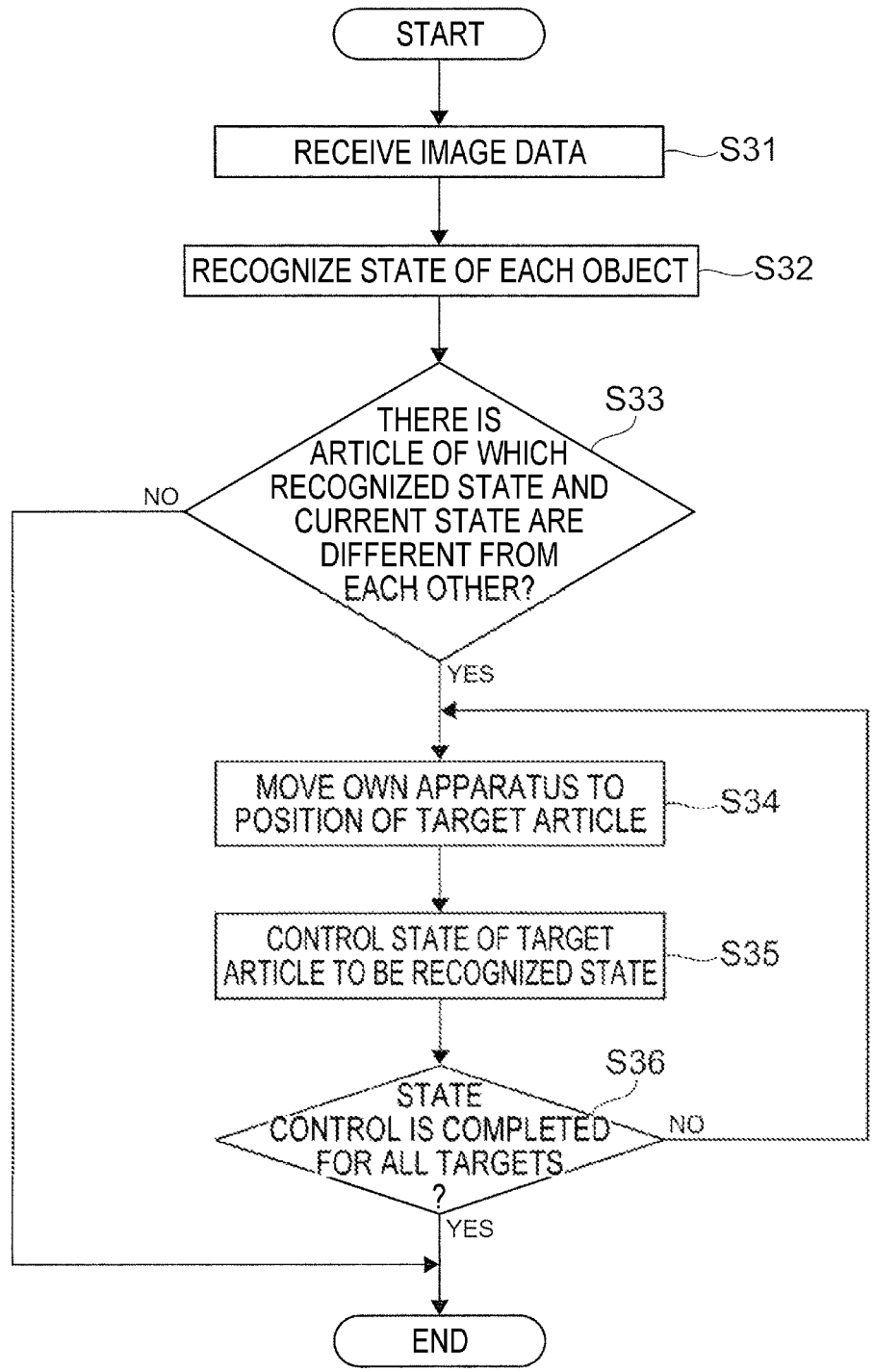
FIG. 18 is a flowchart illustrating a processing operation executed by the robot according to the fourth exemplary embodiment.

FIG. 18 is a flowchart for explaining the processing operations executed by the robot 158 (see FIG. 8) according to the fourth exemplary embodiment.

First, the controller 401 (see FIG. 17) receives image data corresponding to the still image 111 (see FIG. 8) or the photograph 120 (see FIG. 8) through the image receiving unit 421 (see FIG. 17) (Step 31).

Next, the controller 401 recognizes the state of each object included in the image through the function of the state recognition unit 431 (see FIG. 17) (Step 32). Here, the controller 401 recognizes both the state of each object recognized from the image data and the state of the article existing in the real space 150 (see FIG. 8).

Subsequently, the controller 401 determines whether the state recognized for each object is different from the current state of the corresponding article (Step 33).

When it is determined that there is no difference (a negative result is obtained in Step 33), the controller 401 terminates the process at this stage. On the other hand, when it is determined that a difference is found (an affirmative result is obtained in Step 33), the controller 401 moves its own apparatus to the position of the target article using the function of the movement controller 424 (Step 34).

Thereafter, the controller 401 controls the state of the movement destination article to be the recognized state using the function of the operation controller 432 (Step 35).

Further, the controller 401 determines whether the state control has been completed for all the targets (Step 36), and repeats Steps 34 and 35 while a processing target remains.

Figure 19A:
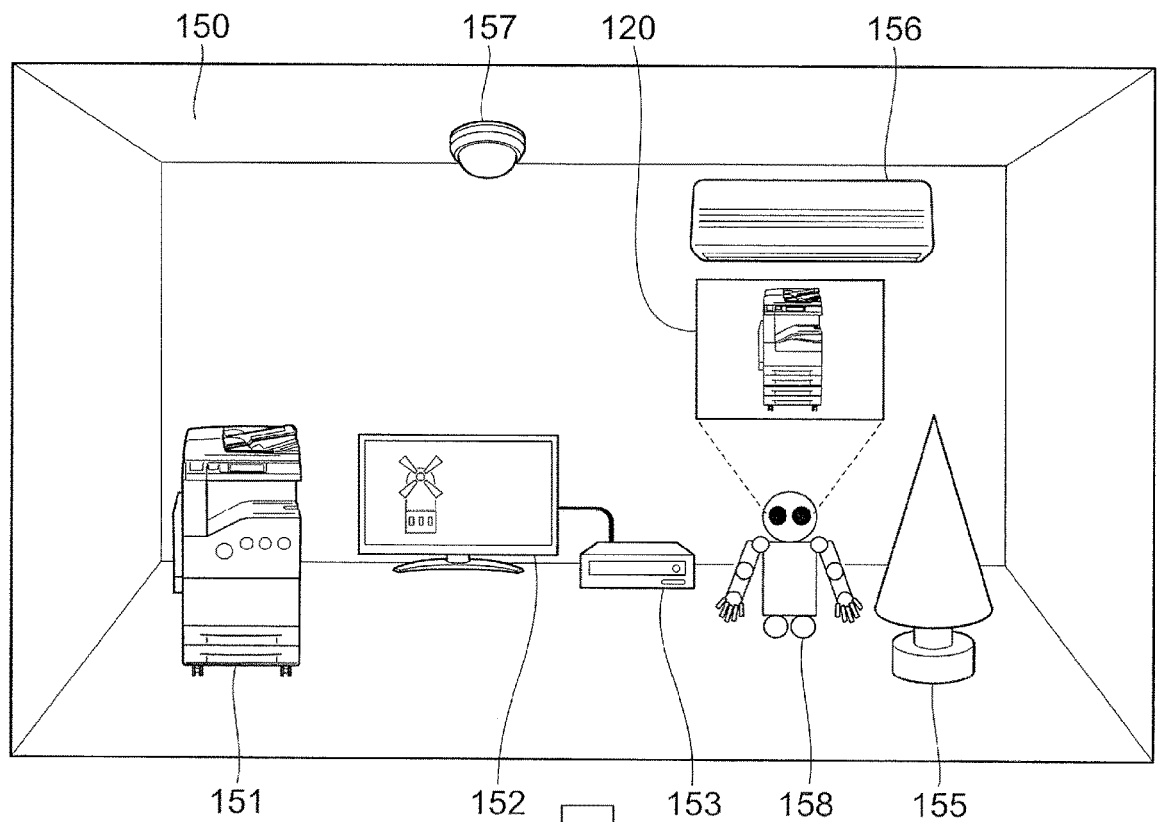
Figure 19B:
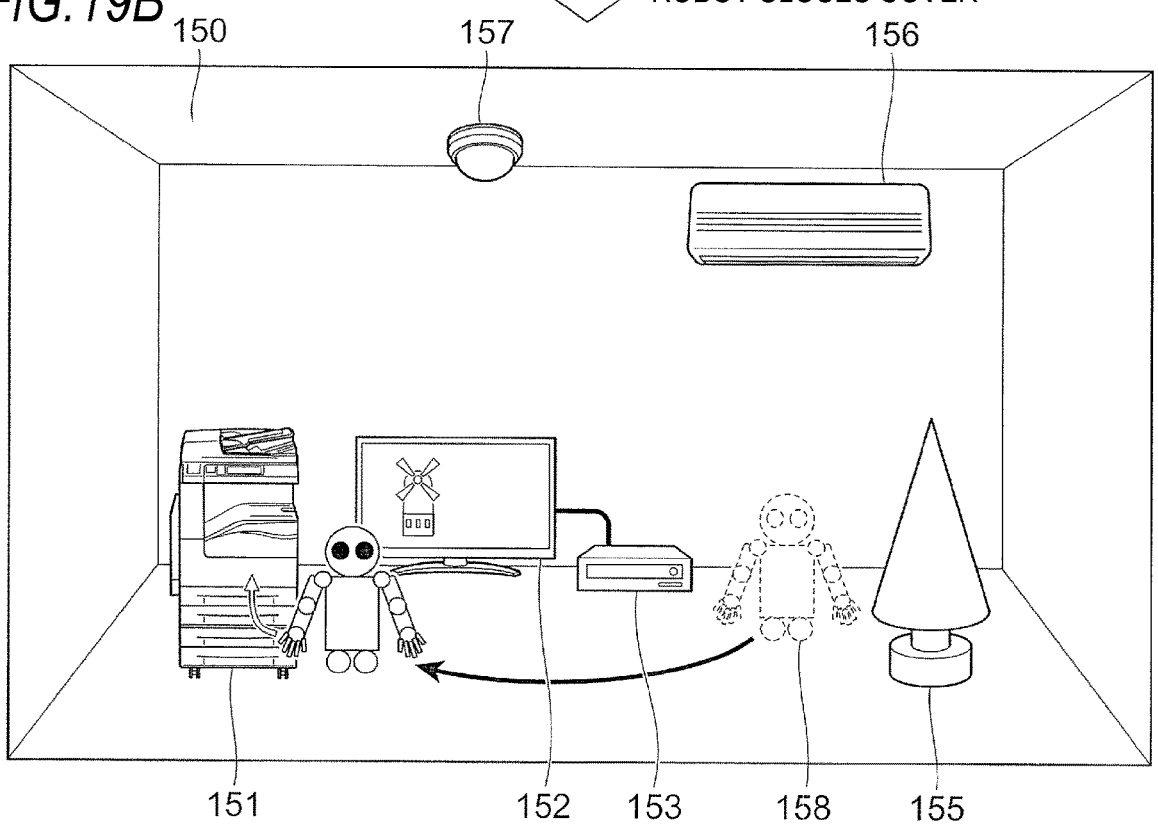

FIGS. 19A and 19B are views for explaining the operation state according to the fourth exemplary embodiment. FIG. 19A illustrates a scene where the photograph 120 is presented to the robot 158, and FIG. 19B illustrates a scene after the robot 158 changes the state of the image forming apparatus 151.

In the example of FIGS. 19A and 19B, the front door of the image forming apparatus 151 is opened and structural portions inside the apparatus (such as toner cartridges corresponding to four colors of yellow (Y), magenta (M), cyan (C), and black (K)) are seen from the outside.

In the meantime, the image of the image forming apparatus 151 in the photograph 120 presented to the robot 158 is in a state in which the front door is closed.

The controller 401 of the robot 158 recognizes that the state of the front door of the image forming apparatus 151 recognized from the image captured by the camera 402 (see FIG. 9) is different from the state of the front door recognized from the photograph 120.

The robot 158 that recognizes the difference moves to the position of the image forming apparatus 151 and drives the arms and the hands to close the front door.

According to the present exemplary embodiment, when there is an image such as the photograph 120 (see FIG. 1) obtained by capturing the image forming apparatus 151 in a desired state, even if the image forming apparatus 151 is not provided with a mechanism for opening and closing the front door, the state may be changed to a state in which the front door of the image forming apparatus 151 is closed by only giving the image of the photograph 120 to the robot 158.

By using this function, it is possible to control the image forming apparatus 151 to a desired state, for example, even from a remote place.

Fifth Exemplary Embodiment

In the present exemplary embodiment, a description will be made of another operation implemented by applying the function described in the fourth exemplary embodiment.

That is, the operation of the robot 158 will be described. In the above-described fourth exemplary embodiment, the article corresponding to the object recognized from a given photograph 120 actually exists in the real space 150. To the contrary, in the present exemplary embodiment, a description will be made of a case where an article that is not included in the photograph 120 is found in the real space 150.

Figure 20:
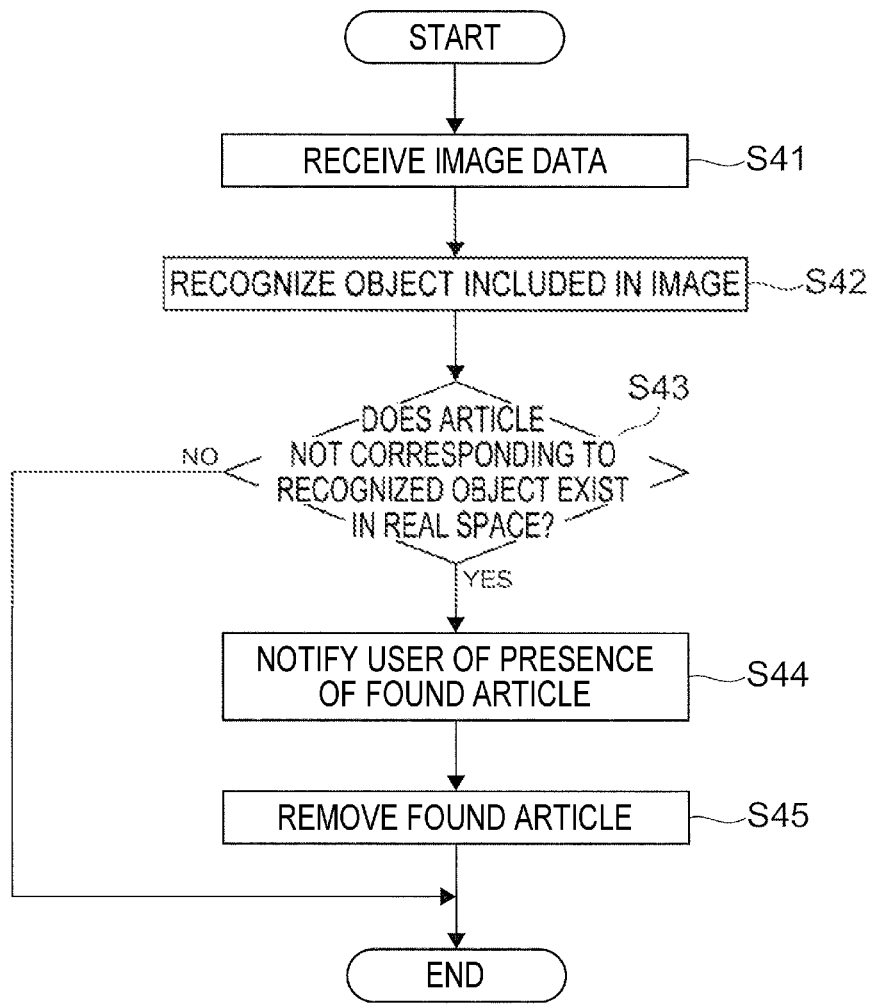
FIG. 20 is a flowchart illustrating a processing operation executed by a robot according to a fifth exemplary embodiment.

FIG. 20 is a flowchart for explaining the processing operations executed by the robot 158 (see FIG. 8) according to the fifth exemplary embodiment.

First, the controller 401 (see FIG. 17) receives image data corresponding to the still image 111 (see FIG. 8) or the photograph 120 (see FIG. 8) through the image receiving unit 421 (see FIG. 17) (Step 41).

Next, the controller 401 processes the received image through the function of the state recognition unit 431 (see FIG. 17) to recognize the object, and recognizes the state of the recognized object (Step 42).

Subsequently, the controller 401 determines whether an article that does not correspond to the recognized object exists in the real space 150 (see FIG. 8) (Step 43). When it is determined that such an article does not exist (a negative result is obtained in Step 43), the controller 401 terminates the process. On the other hand, when it is determined that such an article exits (an affirmative result is obtained in Step 43), the controller 401 notifies the user of the presence of the found article (Step 44). Examples of this notification method include, for example, a method of generating voice indicating the existence of an unknown article from the speaker 403 (see FIG. 9), a method of notifying the computer 110 (see FIG. 8) of data indicating the existence of an unknown article through a communication interface (communication I/F 406) (see FIG. 9), and the like.

In the example illustrated in FIG. 20, the controller 401 also executes an operation of removing the found article (Step 45). In order to remove the found article, the control of moving its own apparatus to the position of the found article, the control of grasping the found article by driving the movable member of its own apparatus (for example, the arms, hands, and feet), the control of moving with the found article to a predetermined position, and the like are executed.

Further, only one of the notification (Step 44) and removal (Step 45) may be executed or the order may be switched.

Figure 21:
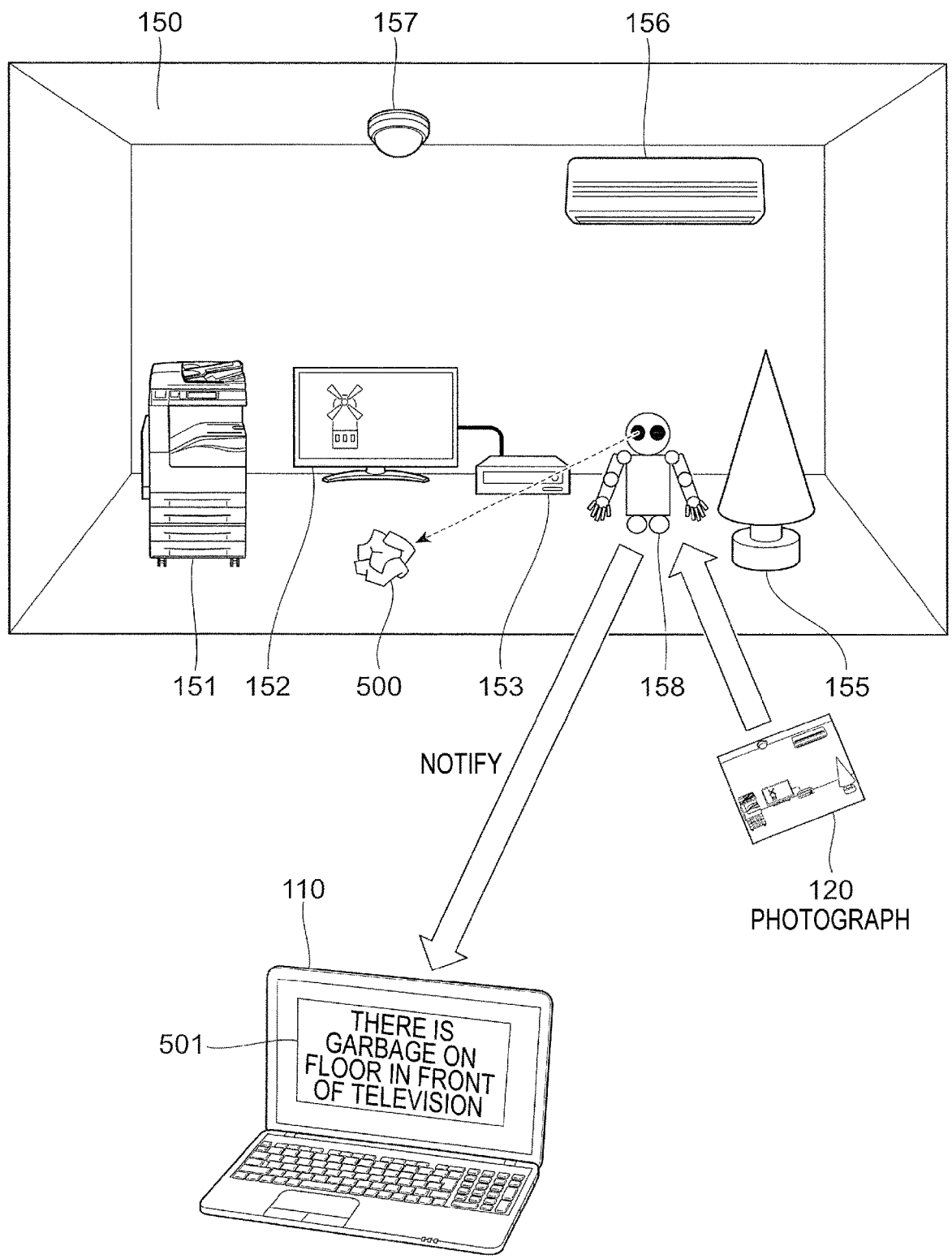
FIG. 21 is a view for explaining an operation state according to the fifth exemplary embodiment.

FIG. 21 is a view for explaining the operation state according to the fifth exemplary embodiment.

In FIG. 21, in a state where the photograph 120 is presented to the robot 158, the object recognized from the photograph 120 and the article in the real space 150 are compared with each other so as to find waste paper 500. Further, the robot 158 detects the position of the waste paper 500 based on the floor plan and the image acquired from the surveillance camera 157. Therefore, the computer 110 receives a message 501 that "there is garbage on the floor in front of the television" and displays the message 501.

Figure 22A:
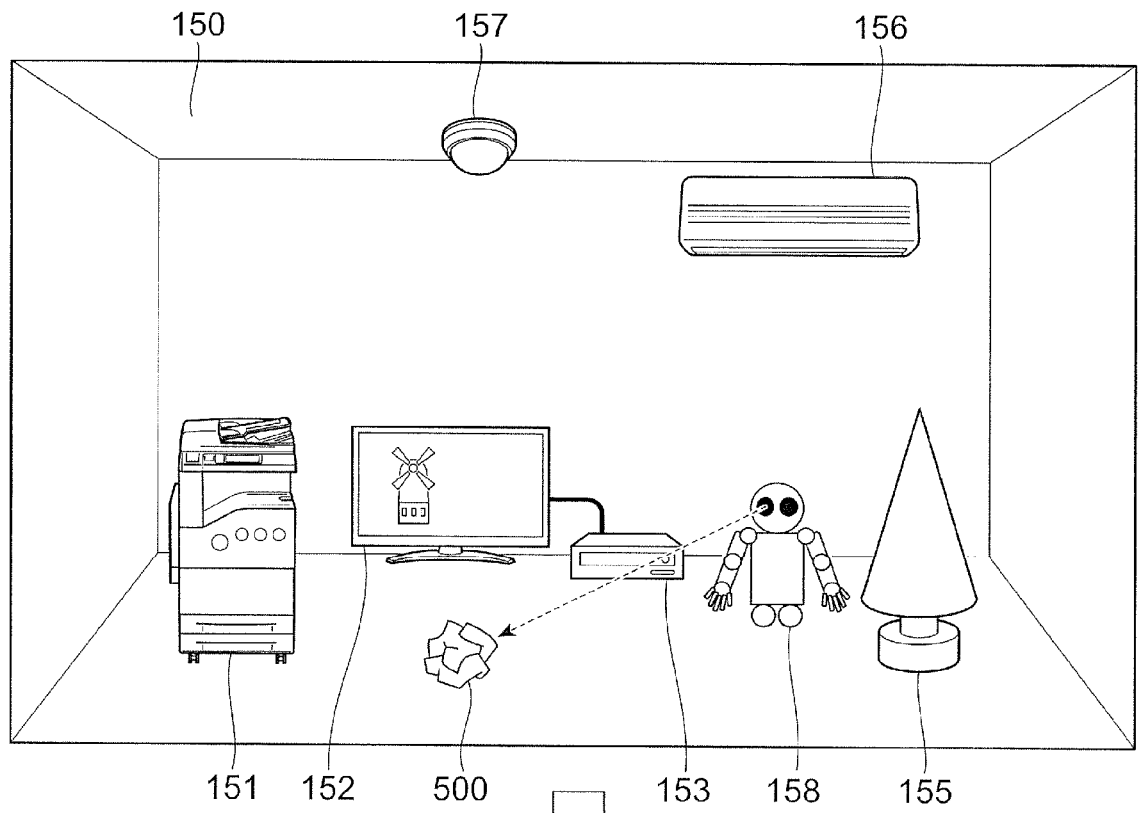
Figure 22B:
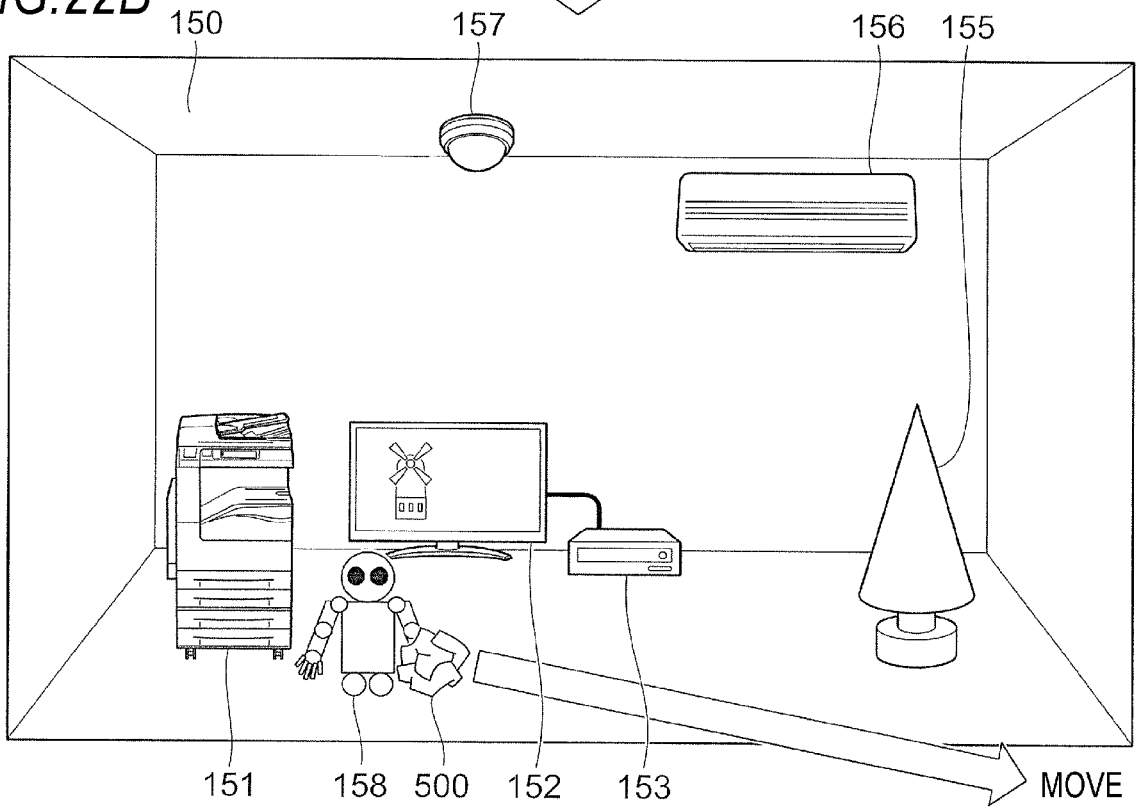

FIGS. 22A and 22B are views for explaining another operation state according to the fifth exemplary embodiment. FIG. 22A illustrates a scene where the robot 158 finds the waste paper 500, and FIG. 22B illustrates a scene where the robot 158 picks up the waste paper 500 and moves the waste paper 500 to another place.

In the example of FIGS. 21, 22A and 22B, the description has been made of the case where the waste paper 500 is found. Alternatively, a lost item may be found. In the case where the waste paper 500 is found, the waste paper 500 may be picked up from the floor and discarded to a garbage can. In the case where the lost item is found, the item is moved to a predetermined place. This operation may be switched based on the recognized information.

Sixth Exemplary Embodiment

In the above-described exemplary embodiment, the description has been made of the case where an application for controlling the operation of its own apparatus or another device by processing the information that is written on the photograph 120 (see FIG. 1) or in the image data D corresponding to the photograph 120 is installed in the target device in advance.

In the present exemplary embodiment, a description will be made of a case where information that defines the series of workflow processes described above is provided to each device as attribute information of the image data D.

It is assumed that the image data D used in the present exemplary embodiment is a JPEG file in compliance with the JPEG format for the sake of convenience. In particular, the image data D may be an image file in compliance with another image format.

Figure 23:
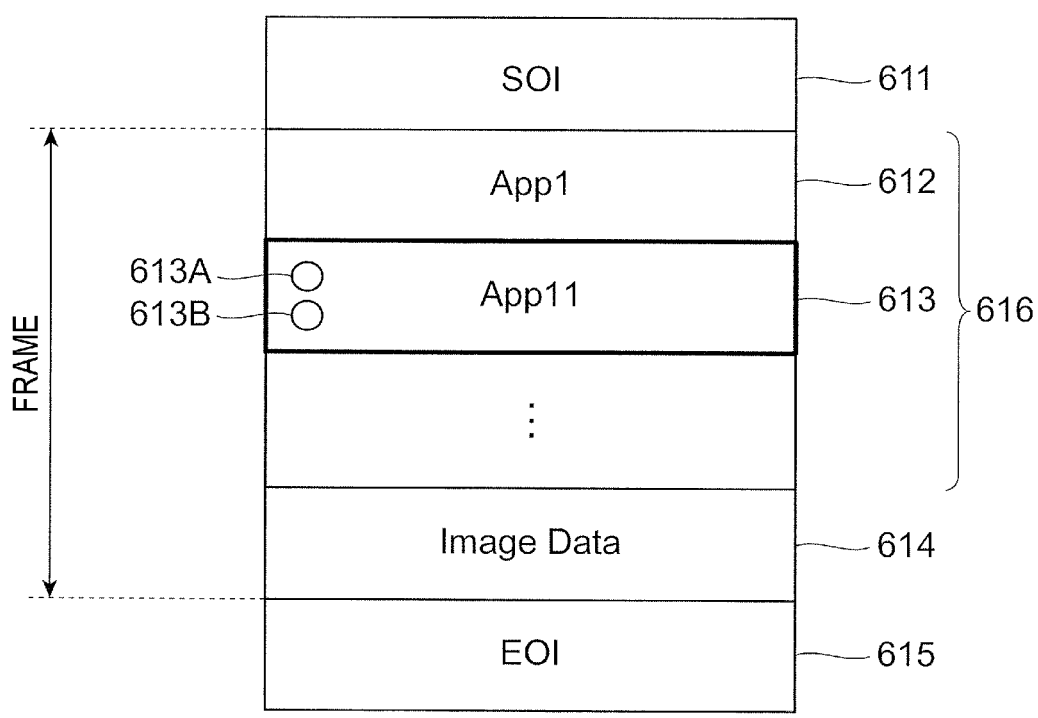
FIG. 23 is a view illustrating a data structure of a JPEG file used in a sixth exemplary embodiment disclosed herein.

FIG. 23 is a view illustrating a data structure of the JPEG file 600 used in the present exemplary embodiment. The JPEG file 600 is an example of an image file in compliance with the JPEG format.

The JPEG file 600 includes: a start of image segment (SOI) 611 representing a start position of an image; an application type 1 segment (App1) 612 used in the description of exchangeable image file format (Exit) information or the like; an application type 11 segment (App11) 613 used in the description of information that defines a workflow process related to an object; image data (ID) 614; and an end of image segment (EOI) 615 representing an end position of the image.

Here, the main body of the still image is stored in the image data 614.

A region interposed between the start of image segment 611 and the end of image segment 615 is also referred to as a frame.

Further, although not illustrated in FIG. 23, the JPEG file also includes two segments (not illustrated), that is, a define quantization table segment (DQT) and a define Huffman table segment (DHT). Segments other than these are provided as required.

The application type 1 segment 612 and the application type 11 segment 613 are portions of the attribute information 616 of the JPEG file 600.

In the application segment 613, information 613A and information 613B are described which define a workflow process related to an object included in a still image for which the JPEG file 600 is created. For example, the information 613A corresponds to a workflow process 1 related to an object 1, and the information 613B corresponds to a workflow process 2 related to an object 2.

The number of pieces of information stored in the application type 11 segment 613 may be zero, one, or three or more. Hereinafter, when the information 613A and the information 613B are not distinguished from each other, the information 613A and the information 613B are simply referred to as information 613A.

For example, the two pieces of information 613A and 613B may be associated with a single object (hereinafter, referred to as an "object"). That is, plural pieces of information may be associated with a single object.

For example, the information 613A may be used for processing by a first language (for example, Japanese, for a first OS), and the information 613B may be used for processing by a second language (for example, English, for a second OS).

Individual workflow processes include, for example, storing, displaying, aggregating, transmitting, and acquiring of information on objects corresponding to the information 613A, and acquiring of information on the real space 150 (see FIG. 1).

The information on objects includes, for example, information held on a real device and an image obtained by capturing the real device or living thing in addition to information existing on the Internet.

Further, the individual workflow processes include, for example, displaying of an operation panel for controlling the operation of a real device corresponding to the object for which the information 613A is recorded, controlling of the operation of the real device which is determined in the information 613A in advance, acquiring of information from the real device corresponding to the object, and reflecting of an acquired real device state to an image.

In addition, for example, the both information 613A and 613B may be provided for each operation type of one device. For example, the information 613A may be used to operate the channel of a television receiver, and the information 613B may be used to operate the power button of the television receiver.

For example, the information 613A is written in the form of text data. In the present exemplary embodiment, a Java Script Object Notation (JSON), which is an example of a data exchange format, is used to write the information 613A. The JSON (registered trademark) is a language that uses a portion of the object notation in JavaScript (registered trademark) as a syntax base. Of course, the language used to write the workflow process is not limited to the JSON.

Here, a description will be made of a case where the image data D is given to the robot 158 (see FIG. 1) as in the first exemplary embodiment.

Figure 24:
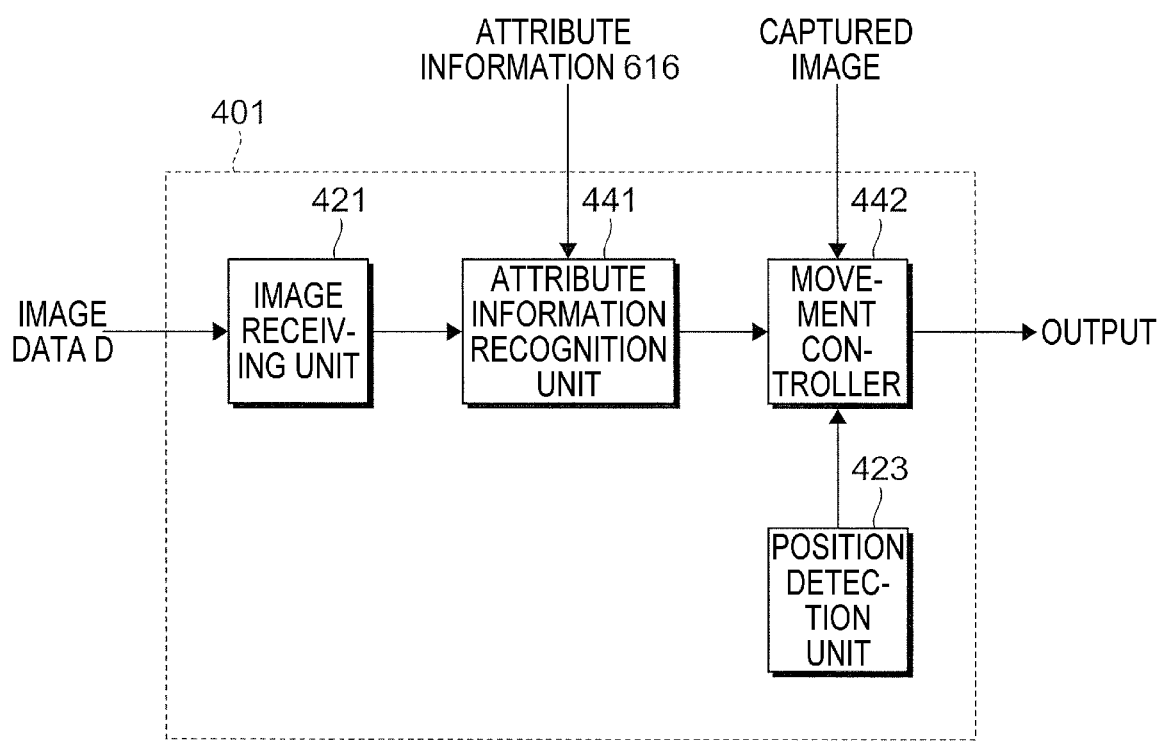
FIG. 24 is a view illustrating an example of a functional configuration of a controller constituting a robot according to the sixth exemplary embodiment.

FIG. 24 is a view illustrating an example of a functional configuration of a controller constituting the robot 158 according to the sixth exemplary embodiment.

In FIG. 24, portions corresponding to those in FIG. 10 are denoted by corresponding reference numerals.

The functional configuration illustrated in FIG. 24 is implemented through execution of firmware by a controller 401. The function required for the firmware is a function of reading the information 613A (see FIG. 23) that defines the workflow process from the attribute information 616 (see FIG. 23) of the image data D and executing the read information 613A.

The controller 401 of the present exemplary embodiment includes: an image receiving unit 421 that receives the image data D from the outside; an attribute information recognition unit 441 that reads the attribute information 616 of the received image data D and recognizes the information 613A (see FIG. 23) associated with each device included as an object; a position detection unit 423 that detects the position of its own apparatus within the real space 150; and a movement controller 442 that controls the moving of its own apparatus through execution of the workflow process described in the recognized information 613A.

Figure 25:
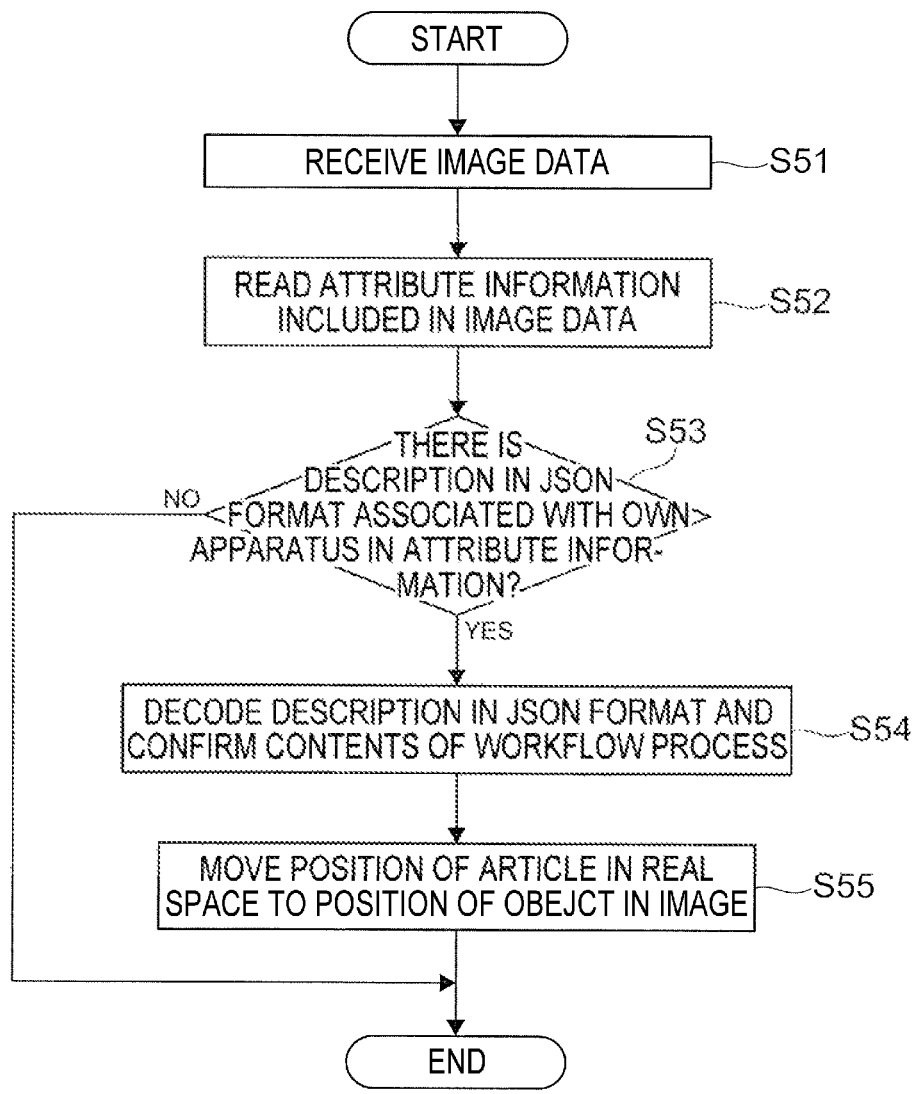
FIG. 25 is a flowchart illustrating an example of a processing operation executed by the controller according to the sixth exemplary embodiment.

FIG. 25 is a flowchart illustrating an example of a processing operation executed by the controller 401 (see FIG. 24) according to the sixth exemplary embodiment.

FIG. 25 assumes a case where the processing operation described with reference to FIG. 24 is executed according to the workflow process defined by the attribute information 616 included in the image data.

First, the controller 401 receives the image data D through the image receiving unit 421 (Step 51).

Next, the controller 401 reads the attribute information 616 included in the image data through the function of the attribute information recognition unit 441 (Step 52).

Subsequently, the controller 401 determines whether there is a description in the JSON format associated with its own apparatus in the attribute information 616 (Step 53).

When an affirmative result is obtained in Step 53, the controller 401 decodes the description in the JSON format and confirms the contents of the workflow process (Step 54). Here, it is assumed that an execution procedure related to the movement of the article, which has been described in the second exemplary embodiment, is described as a workflow process.

Therefore, the controller 401 executes the same process as that in the second exemplary embodiment, as the workflow process. That is, the controller 401 executes an operation of moving the position of the article in the real space 150 to the position of the object in the image (Step 55).

Figure 26:
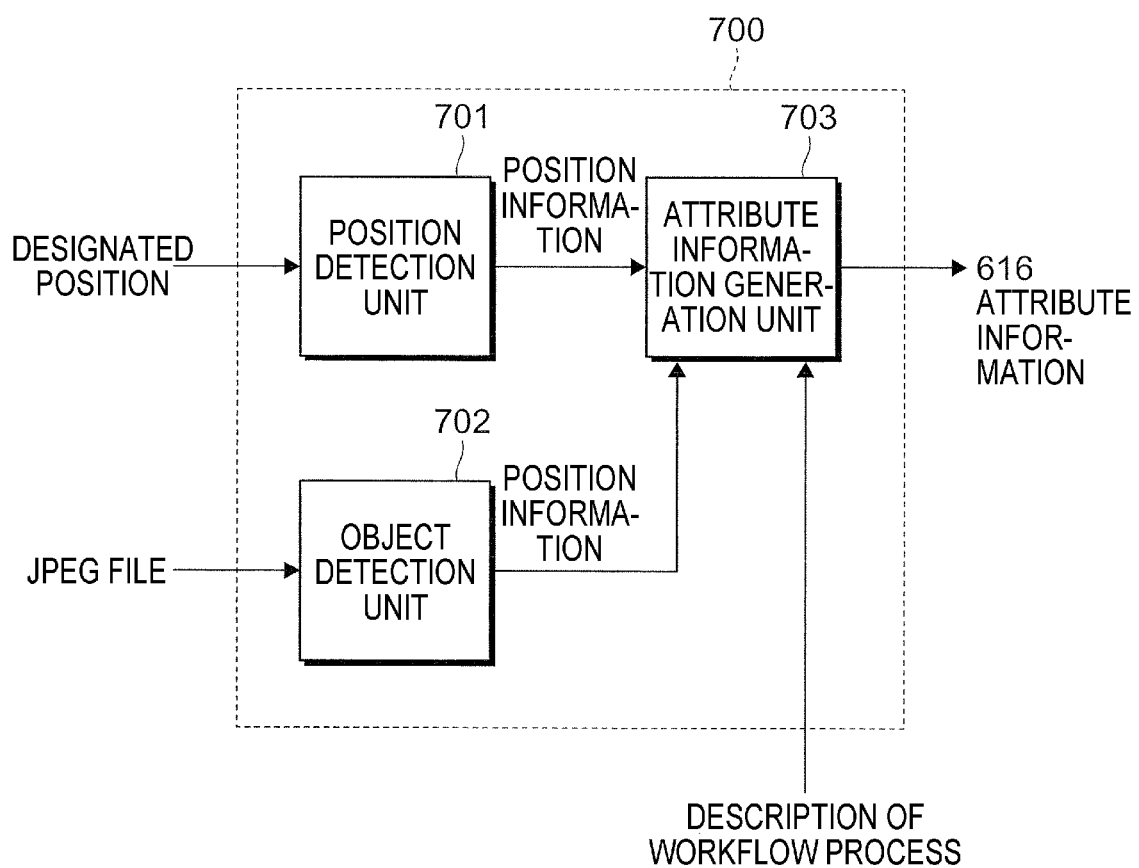
FIG. 26 is a block diagram illustrating an example of a functional configuration of a controller constituting an information processing apparatus used for recording information that defines a workflow process.

FIG. 26 is a block diagram illustrating an example of a functional configuration of a controller 700 constituting an information processing apparatus (for example, a computer 110) used for recording the information 613A (see FIG. 23) that defines the workflow process.

Here, the controller 700 functions as a position detection unit 701 that detects an object region designated by a user, an object detection unit 702 that detects a region of an image to be registered as an object using the image processing technology from the image data 614 (see FIG. 23) of the JPEG file 600 (see FIG. 23), and an attribute information generation unit 703 that generates the attribute information 616 in association with the descriptions of the workflow processes to be associated with respective detected regions.

Figure 27:
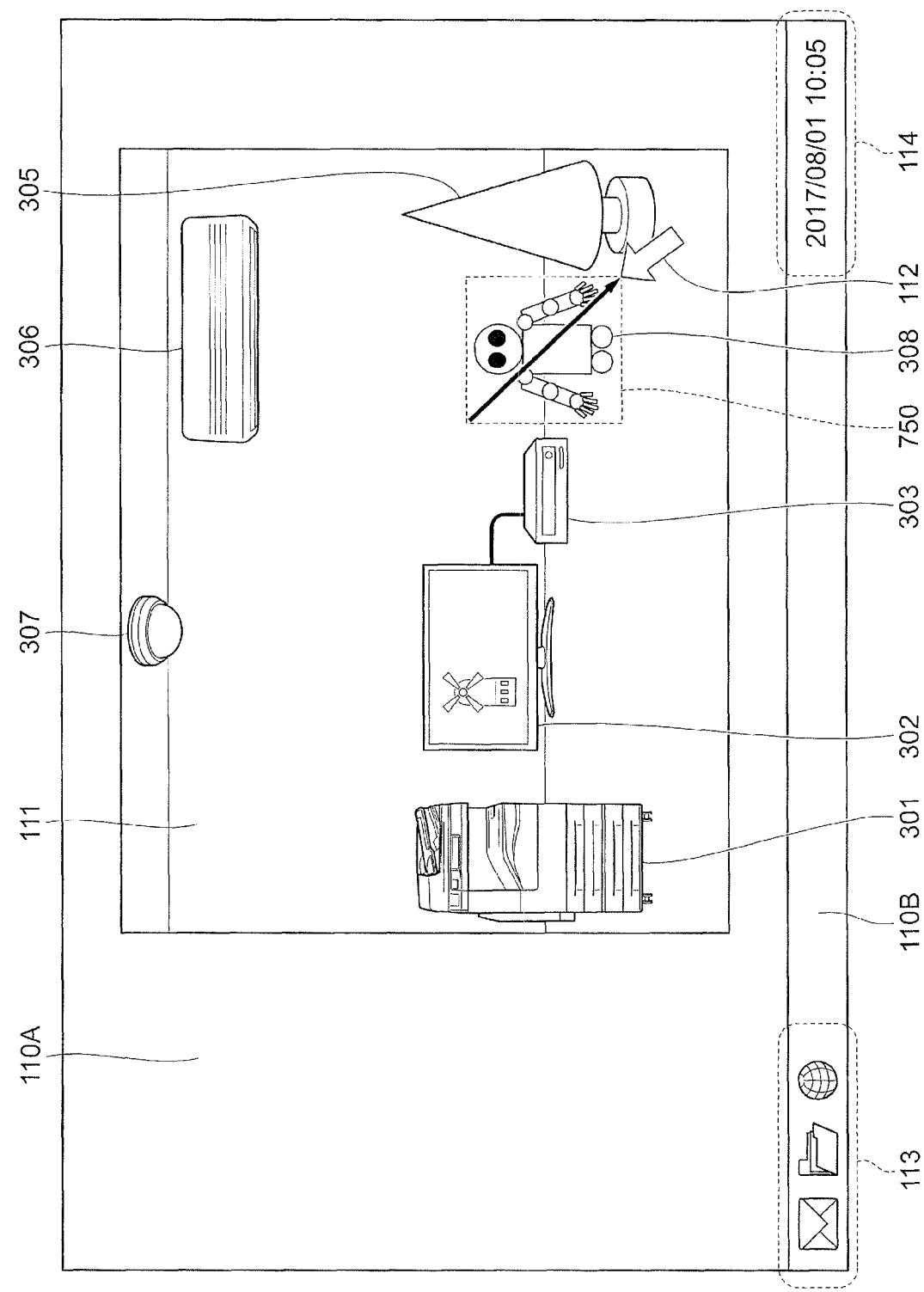
FIG. 27 is a view for explaining an example of designation of a region of an object by a user.

FIG. 27 is a view for explaining an example of the designation of the object region by the user. In FIG. 27, by dragging the mouse pointer 112, a region 750 is set so as to surround a display region of an image 308 of a robot, which is one of the objects included in the still image 111, with a broken line.

FIG. 26 is referred to again.

As coordinate information defining this region 750 (see FIG. 27), the position detection unit 701 outputs, for example, the coordinate values of the upper left corner, which is the starting point of the dragging, the number of pixels by which the mouse pointer 112 moves in the vertical direction until the end of the dragging, and the number of pixels by which the mouse pointer 112 moves in the horizontal direction until the end of the dragging.

The object detection unit 702 is used when an image (registered image) of an image, which is recorded with the information 613A (see FIG. 23), is registered in advance.

The object detection unit 702 executes a matching process between the registered image and the image data 614 (see FIG. 23) included in the JPEG file 600 (see FIG. 23), and outputs the coordinate information that specifies a region where the image (object) matching the registered image exists as position information.

The attribute information generation unit 703 executes a process of associating a description of a workflow process input through another screen or prepared in advance with each position information. Also, in this exemplary embodiment, the workflow process is described in the JSON format.

Further, in the case where the articles in the real space corresponding to the object are devices, when the serial number that specifies each device through the IoT network and the address information on the IoT network are collected at the time of capturing the still image 111 and associated with the still image 111, it is possible to eliminate the labor of manually inputting the serial number and the like of each device.

In addition, as described in the first exemplary embodiment, an article in the real space to be associated with each image does not need to be a real article corresponding to each image.

Figure 28A:
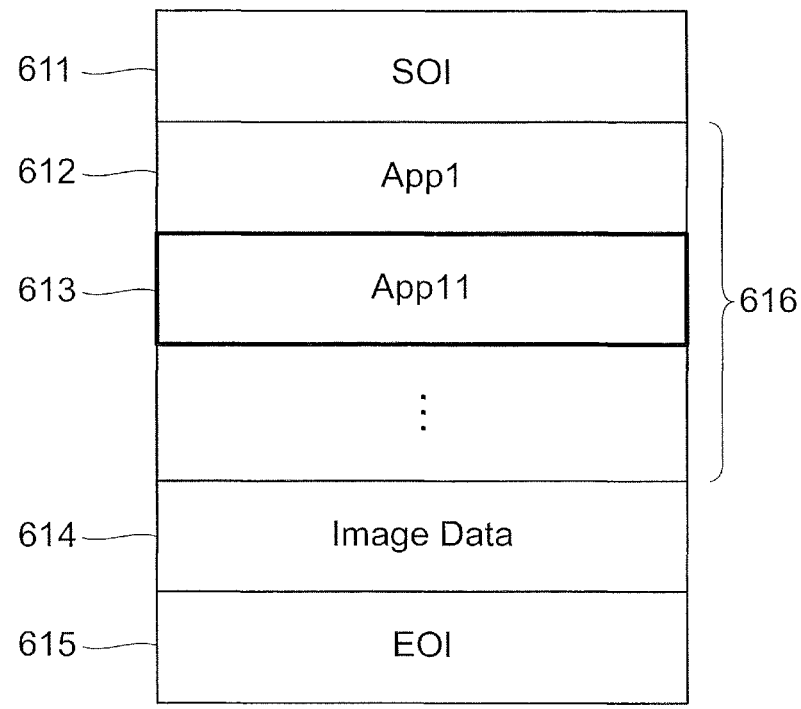
Figure 28B:
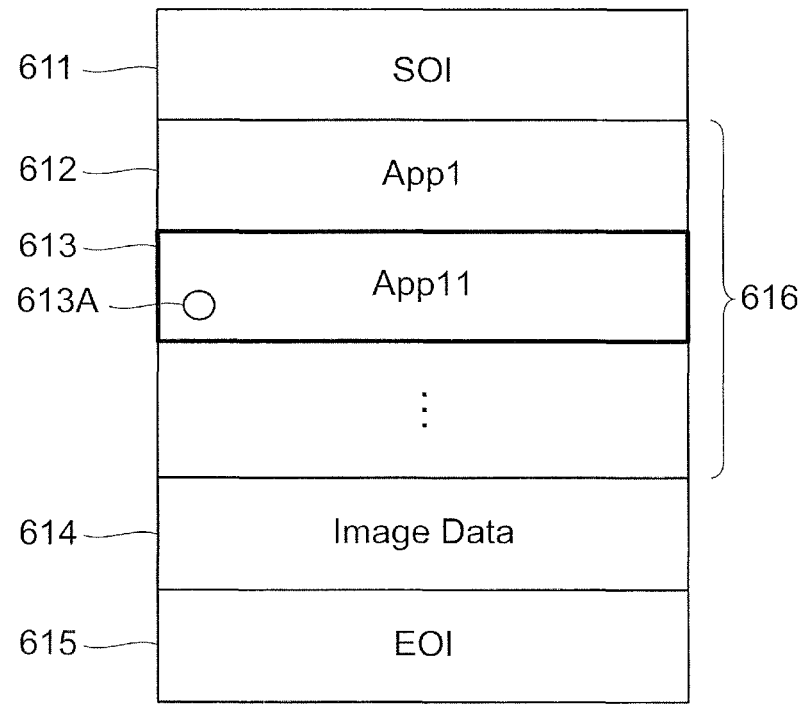

FIGS. 28A and 28B are views for explaining the writing of the information 613A defining the workflow process to the attribute information 616. FIG. 28A illustrates the data structure before the information 613A is included in the attribute information 616 of the JPEG file 600, and FIG. 28B illustrates a state in which the information 613A is added to the attribute information 616 of the JPEG file 600.

In this way, the information 613A defining the workflow process may be added to the existing JPEG file 600 later.

According to the present exemplary embodiment, even if a program for moving the position of the article in the real space 150 (see FIG. 8) with reference to the photograph 120 (see FIG. 8) is not installed in the robot 158 (see FIG. 8), when a function of reading and executing the attribute information 616 (see FIG. 23) of the image data D is provided, a control equivalent to that in the second exemplary embodiment may be implemented through the workflow process defined by the attribute information 616.

Further, in the present exemplary embodiment, the user may freely designate the contents of the workflow process that he/she wants the robot 158 to execute.

Other Exemplary Embodiments

Although the exemplary embodiments of the present invention have been described above, the technical scope of the present invention is not limited to the ranges described in the above exemplary embodiments. It is also apparent from the description of the claims that various modifications or improvements to the above exemplary embodiments are included in the technical scope of the present invention.

For example, in the above-described exemplary embodiment, the user gives the photograph 120 or the image data D to the device which is the subject of the operation. Alternatively, the photograph 120 or the image data D may be given via a relay device. Further, the control of the operation of each device is executed by the controller provided in each device. Alternatively, a part or all of the control operation may be executed by another device (for example, a server), and individual devices may be operated based on control from the other device.

Figure 29:
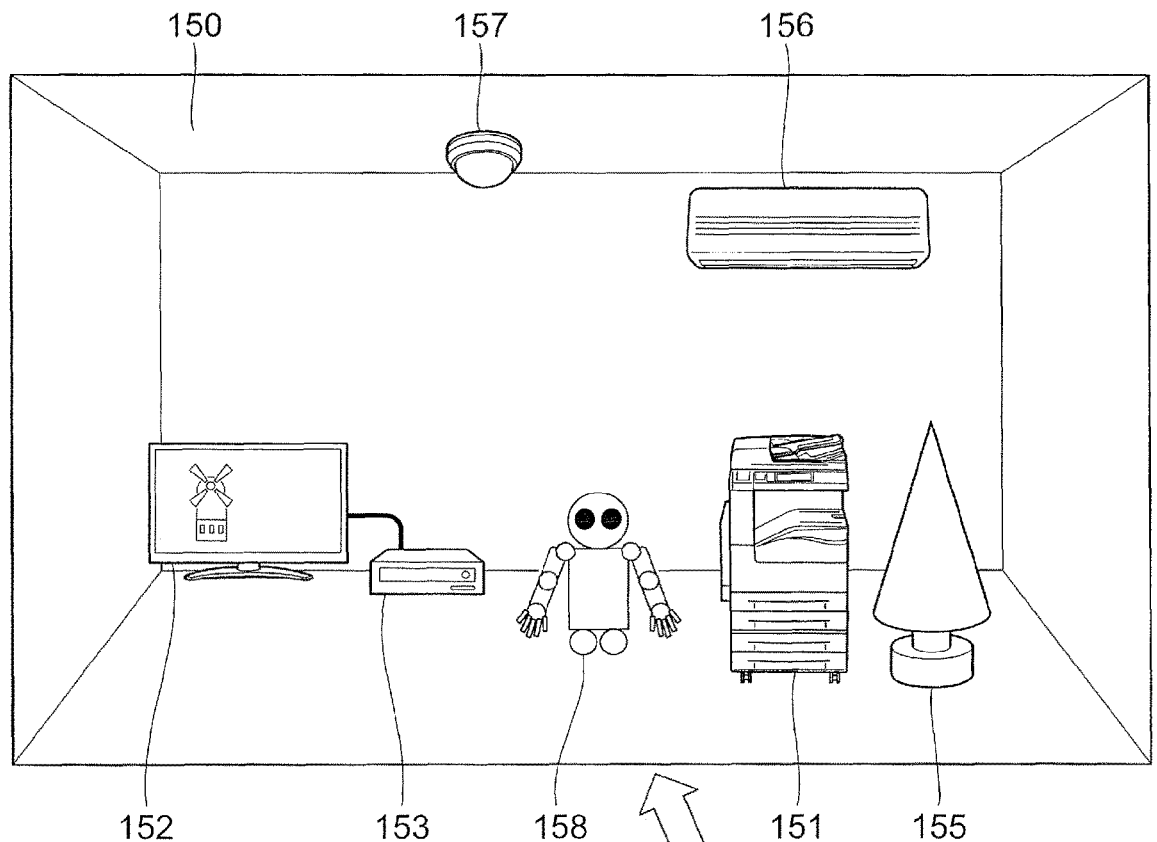
FIG. 29 is a view for explaining a system configuration that uses a server as a relay device.
Figure 29:
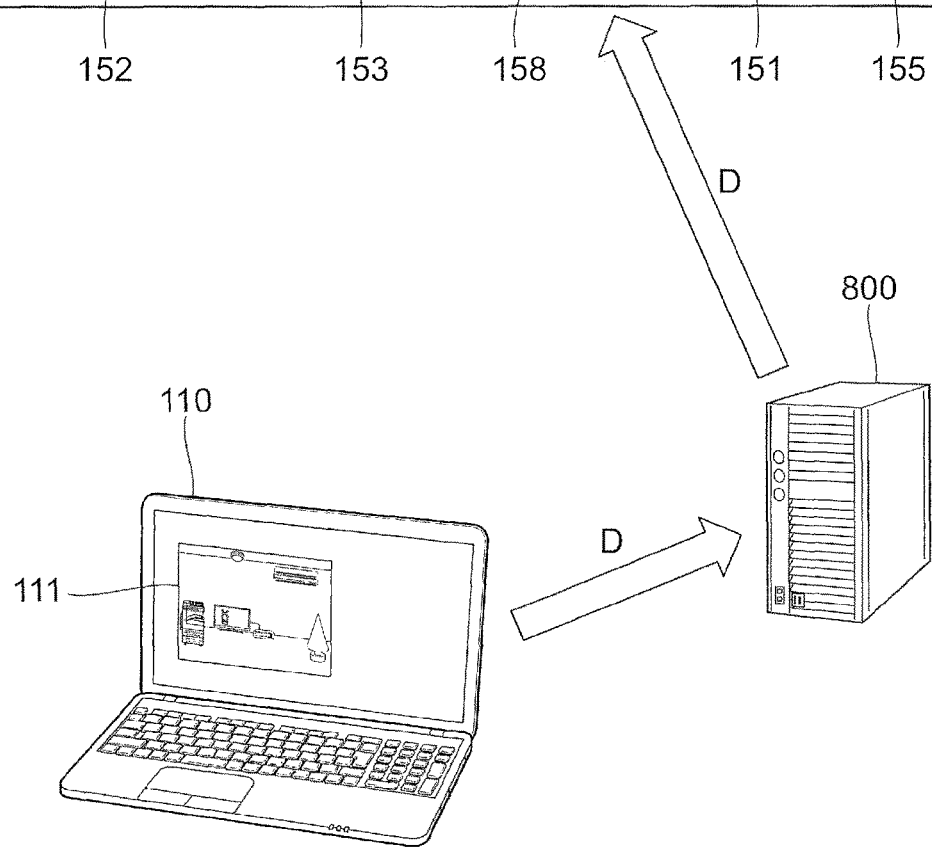

FIG. 29 is a view for explaining a system configuration using a server 800 as a relay device.

The server 800 may utilize more computational resources than the devices present in the real space 150. Therefore, the computation with a heavy load may be executed on the server 800. When the server 800 collects information on devices and articles existing in the real space 150, the server 800 may execute highly accurate control and determination using more information.

In the above-described exemplary embodiments, the workflow process is recorded in a portion of the attribute information 616 (see FIG. 23) using the JSON format. Alternatively, the workflow process may be recorded in a portion of the attribute information 616 in the format of sound data or a text format other than the JSON format or in a separate file associated with the JPEG file 600 (see FIG. 23). For example, when there is a limit on the data region allocated to the attribute information 616, the workflow process may be recorded as a separate file.

When the workflow process is recorded in the format of sound data, the reproduction sound of the sound data may be analyzed to execute the corresponding workflow process. In this case, the sound data may be recorded as a combination of tone signals. Further, the workflow process may be executed by analyzing the frequency components and waveform patterns without reproducing the sound data.

In the above-described exemplary embodiment, the description has been made of the case where a device that is given the image data such as the photograph 120 (see FIG. 1) self-travels (the first exemplary embodiment) and the case where a device that is given the image data such as the photograph 120 (see FIG. 1) moves another device (the second exemplary embodiment). Alternatively, a device that is given the photograph 120 (see FIG. 1) may control another device to move the position of its own apparatus.

For example, the image forming apparatus 151 (see FIG. 8) that is given the image data such as the photograph 120 (see FIG. 8) may instruct the robot 158 (see FIG. 8) to move the position of its own apparatus.

In the above-described exemplary embodiment, all articles the arrangement and positions of which in the real space are different from the arrangement and positions in the photograph 120 (see FIG. 1) are movement targets. Alternatively, the articles to be moved or to be excluded from movement may be designated through the photograph 120. For example, when a predetermined writing, a predetermined symbol, or the like is attached to the image on the photograph 120, the target article may be set as a movement target or may be excluded from movement targets. For example, when a cross mark (a symbol in the X form) is attached on the image 305 (see FIG. 4) of the planted tree 155 (see FIG. 1), the planted tree 155 may be excluded from the movement targets. In addition, for example, when a circle mark (a symbol in the O form) is attached on the image 305 of the planted tree 155, only the planted tree 155 may be set as the movement target.

In the above-described exemplary embodiment, the description has been made of the case where the robot 158 (see FIG. 8) is used for moving the planted tree 155 (see FIG. 1). When the planted tree 155 is disposed on a self-traveling pedestal, the position of the planted tree 155 may be moved through the movement of the pedestal by transmitting the image data D to the self-traveling pedestal or by communicating with the controller provided in the device that captures the photograph 120 (see FIG. 8). The same applies to the display device 152 and the recording and reproducing device 153.

In the above-described exemplary embodiment, the description has been made of the case where the position of the image forming apparatus 151 (see FIG. 1) in the real space 150 (see FIG. 1) and the position of the planted tree 155 (see FIG. 1) are moved using the still image 111 (see FIG. 1). It should be noted that in this case, the movement target is limited for the sake of simplicity of explanation. In actuality, movement of plural articles, removal of garbage, change of an operation state, and the like may be executed at the same time. By using this function, the scene of the still image 111 may be reproduced in any real space 150 (see FIG. 1) with small ability.

In the above-described exemplary embodiment, the photograph 120 (see FIG. 1) is used for moving the article in the real space 150. Alternatively, a moving image may be used. By using a moving image, the arrangement of articles may be discontinuously designated like a state in which the arrangement of articles changes slightly over time or the change of scenes.

For example, immediately after the start of the reproduction of the moving image, the planted tree 155 (see FIG. 1) may be located on the left side wall of the room, located in the center of the room after 1 hour, and located on the right side wall of the room after 2 hours.

In addition, for example, immediately after the start of the reproduction of the moving image, the front door of the image forming apparatus 151 (see FIG. 1) is closed, and after 1 hour, the control of starting replacing the toner may be implemented by opening the front door.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a receiver that receives an image; and
   a controller that controls a state in a real space based on information included in the received image, wherein the information included in the received image comprises an arrangement of the information processing apparatus in the image.

2. The information processing apparatus according to claim 1, wherein the controller moves a position of the information processing apparatus according to the arrangement of the information processing apparatus in the image.

3. The information processing apparatus according to claim 2, further comprising:
   a moving unit, wherein
   the controller controls the moving unit to move the position of the information processing apparatus.

4. The information processing apparatus according to claim 2, wherein the controller controls another device existing in the real space to move the position of the information processing apparatus.

5. The information processing apparatus according to claim 1, wherein the controller acquires a position of the information processing apparatus in the real space from a sensor.

6. The information processing apparatus according to claim 5, wherein the controller moves the position of the information processing apparatus by comparing the position of the information processing apparatus with information of the space.

7. The information processing apparatus according to claim 1, wherein the controller moves a position of another article according to an arrangement of an object in the image.

8. The information processing apparatus according to claim 7, further comprising:
   a movable unit, wherein
   the controller controls the movable unit to move the position of the other article.

9. The information processing apparatus according to claim 7, wherein the controller controls a moving unit of another article or a moving unit associated with the other article to move the position of the other article.

10. The information processing apparatus according to claim 1, wherein the controller acquires a position of another article in the real space from a sensor.

11. The information processing apparatus according to claim 10, wherein the controller moves the position of the other article by comparing the position of the other article with information of the space.

12. The information processing apparatus according to claim 1, wherein the controller controls a state of the information processing apparatus according to an appearance of the information processing apparatus in the image.

13. The information processing apparatus according to claim 1, wherein the controller controls a state of another article according to an appearance of the other article in the image.

14. The information processing apparatus according to claim 1, wherein when an article that is not included in the image as an object exists in the real space, the controller executes a predetermined process.

15. The information processing apparatus according to claim 14, wherein the predetermined process includes moving the article which is not included in the image.

16. The information processing apparatus according to claim 14, wherein the predetermined process includes notifying an existence of the article that is not included in the image.

17. The information processing apparatus according to claim 1, wherein a condition required for the control is given by text.

18. The information processing apparatus according to claim 1, wherein a condition required for the control is given by voice.

19. The information processing apparatus according to claim 1, wherein when information that defines a workflow process is included in attribute information of an image file, the controller controls a device corresponding to a specific object associated with the information.

20. The information processing apparatus according to claim 19, wherein
   the image file is in compliance with a JPEG format, and
   the information that defines the workflow process is describe in a JSON format.

21. The information processing apparatus according to claim 1, wherein when the image is a moving image, the controller controls the state in the real space to reproduce a state of the image at each reproduction time.

22. A non-transitory computer readable medium storing a program causing a computer to execute information processing, the information processing comprising:
   receiving, by a receiver of an information processing apparatus, an image; and
   controlling, by a controller of the information processing apparatus, a state in a real space based on information included in the received image, wherein the information included in the received image comprises an arrangement of the information processing apparatus in the image.

* * * * *